US011496754B2

United States Patent
Yu et al.

(10) Patent No.: US 11,496,754 B2
(45) Date of Patent: Nov. 8, 2022

(54) VIDEO ENCODER, VIDEO DECODER, AND CORRESPONDING METHOD OF PREDICTING RANDOM ACCESS PICTURES

(71) Applicants: Zhejiang University, Zhejiang (CN); Huawei Technologies Co., Ltd., Shenzhen (CN)

(72) Inventors: Lu Yu, Hangzhou (CN); Ye-Kui Wang, Shenzhen (CN); Yuqun Fan, Shenzhen (CN); Hualong Yu, Hangzhou (CN); Yin Zhao, Hangzhou (CN); Xiangyu Lin, Hangzhou (CN); Haitao Yang, Shenzhen (CN)

(73) Assignees: Zhejiang University, Zhejiang (CN); Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/366,735

(22) Filed: Jul. 2, 2021

(65) Prior Publication Data
US 2021/0337220 A1    Oct. 28, 2021

Related U.S. Application Data

(63) Continuation of application No. PCT/CN2020/070520, filed on Jan. 6, 2020.

(30) Foreign Application Priority Data

Jan. 7, 2019  (CN) .......................... 201910013545.9
Dec. 31, 2019  (CN) .......................... 201911424851.8

(51) Int. Cl.
H04N 19/184  (2014.01)
H04N 19/136  (2014.01)
(Continued)

(52) U.S. Cl.
CPC ......... *H04N 19/184* (2014.11); *H04N 19/136* (2014.11); *H04N 19/172* (2014.11); *H04N 19/124* (2014.11)

(58) Field of Classification Search
None
See application file for complete search history.

(56) References Cited

U.S. PATENT DOCUMENTS 7,385,532 B1    6/2008  Schumacher
2018/0302640 A1*  10/2018  Li ........................... H04N 19/17

FOREIGN PATENT DOCUMENTS

CN    102685548 A    9/2012
CN    104602025 A    5/2015
(Continued)

OTHER PUBLICATIONS

Xuguang Zuo, Lu Yu, Hualong Yu, Jue Mao, Yin Zhao, "Scene-library-based video coding scheme exploiting long-term temporal correlation," J. Electron. Imag. 26(4) 043026 (Aug. 30, 2017) (Year: 2017).*

(Continued)

*Primary Examiner* — Stuart D Bennett
(74) *Attorney, Agent, or Firm* — Leydig, Voit & Mayer, Ltd.

(57) ABSTRACT

A decoding method includes obtaining an identifier from a bitstream, where the identifier indicates a minimum decoding time interval k between library pictures that is allowed in the bitstream, obtaining, when parsing the bitstream, a decoding moment $t_i$ of a current decoded picture and a decoding moment $t_j$ of a first decoded picture that is closest to the current decoded picture and that references a new library picture when the current decoded picture is decoded by referencing a library picture, where the new library picture is a library picture that is not decoded or needs to be re-decoded when the first decoded picture is decoded, and (Continued)

determining a preset quantity of library pictures as candidate reference pictures of the current decoded picture based on a relationship between k and a difference between $t_i$ and $t_j$.

20 Claims, 16 Drawing Sheets

(51) Int. Cl.
　　*H04N 19/172*　　(2014.01)
　　*H04N 19/124*　　(2014.01)

(56) References Cited

FOREIGN PATENT DOCUMENTS

| | | |
|---|---|---|
| CN | 104768011 A | 7/2015 |
| CN | 104902279 A | 9/2015 |
| CN | 108243339 A | 7/2018 |

OTHER PUBLICATIONS

Zuo et al., "Scene-library-based video coding scheme exploiting long-term temporal correlation," XP055439291, Journal of Electronic Imaging 26(4), 043026, 13 pp. (Year: 2017).*

"Series H: Audiovisual and Multimedia Systems, Infrastructure of audiovisual services—Coding of moving Video Information technology—Generic coding of moving pictures and associated audio information: Video: Frame packing arrangement signalling for 3D content," ITU-T H.262 (Feb. 2012), Amendment 4, total 238 pages, International Telecommunication Union (Feb. 2012).

"Series H: Audiovisual and Multimedia Systems, Infrastructure of audiovisual services—Coding of moving video, Video coding for low bit rate communication," ITU-T H.263 (Jan. 2005), total 226 pages, International Telecommunication Union (Jan. 2005).

"Series H: Audiovisual and Multimedia Systems, Infrastructure of audiovisual services—Coding of moving video, Advanced video coding for generic audiovisual services," ITU-T H.264 (Apr. 2017), total 812 pages, International Telecommunication Union (Apr. 2017).

"Series H: Audiovisual and Multimedia Systems Infrastructure of audiovisual services—Coding of moving video, High efficiency video coding," ITU-T H.265 (Feb. 2018), total 692 pages, International Telecommunication Union (Feb. 2018).

Zuo et al., "Scene-library-based video coding scheme exploiting long-term temporal correlation," XP055439201, Journal of Electronic Imaging 26(4), 043026, total 13 pages (Jul./Aug. 2017).

Yu et al., "Video coding based on cross RAP referencing (CRR)," XP030200637, JVET-M0360-v2, total 5 pages (Jan. 9-18, 2019).

Samuelsson et al., "Dependent Random Access Point (DRAP) pictures in DASH," XP030268482, ISO/IEC JTC1/SC29/WG11,m37913, total 4 pages (Feb. 2016).

Pettersson et al., "Dependent random access point pictures in HEVC," XP032826592, pp. 867-871 (2015).

* cited by examiner

VIDEO ENCODER, VIDEO DECODER, AND CORRESPONDING METHOD OF PREDICTING RANDOM ACCESS PICTURES

CROSS-REFERENCE TO RELATED APPLICATIONS

This application is a continuation of International Patent Application No. PCT/CN2020/070520 filed on Jan. 6, 2020, which claims priority to Chinese Patent Application No. 201911424851.8 filed on Dec. 31, 2019 and Chinese Patent Application No. 201910013545.9 filed on Jan. 7, 2019. The disclosures of the aforementioned applications are hereby incorporated by reference in their entireties.

TECHNICAL FIELD

The present disclosure relates to the field of video coding, and in particular, to a video picture encoding method and apparatus, a video picture decoding method and apparatus, and a corresponding encoder and decoder.

BACKGROUND

Digital video capabilities can be incorporated into a wide variety of apparatuses, including a digital television, a digital live broadcast system, a wireless broadcast system, a personal digital assistant (PDA), a laptop or desktop computer, a tablet computer, an e-book reader, a digital camera, a digital recording apparatus, a digital media player, a video game apparatus, a video game console, a cellular or satellite radio phone (also referred to as a "smartphone"), a video conferencing apparatus, a video streaming transmission apparatus, and the like. A digital video apparatus implements video compression technologies, for example, video compression technologies described in standards including Moving Picture Experts Group (MPEG)-2, MPEG-4, International Telecommunication Union (ITU) Telecommunication Standardization Sector (ITU-T) H.263, and ITU-T H.264/MPEG-4 part 10 Advanced Video Coding (AVC), the video coding standard H.265/High Efficiency Video Coding (HEVC) standard, and extensions of these standards. The video apparatus may transmit, receive, encode, decode, and/or store digital video information more efficiently by implementing these video compression technologies.

The video compression technologies are used to perform spatial (intra-picture) prediction and/or temporal (inter-picture) prediction to reduce or remove inherent redundancy in video sequences. In block-based video coding, a video slice (namely, a video frame or a part of a video frame) may be partitioned into picture blocks, and the picture block may also be referred to as a tree block, a coding unit (CU), and/or a coding node. A picture block in a to-be-intra-coded (I) slice of a picture is coded by performing spatial prediction based on a reference sample in a neighboring block in the same picture. A picture block in a to-be-inter-coded (P or B) slice of a picture may be coded by performing spatial prediction based on a reference sample in a neighboring block in the same picture or temporal prediction based on a reference sample in another reference picture. The picture may be referred to as a frame, and the reference picture may be referred to as a reference frame.

SUMMARY

Embodiments of this application provide a video picture coding method and apparatus, and a corresponding encoder and decoder, to improve accuracy of predicting motion information of a picture block to some extent, and improve coding performance.

According to a first aspect, an embodiment of this application provides a video decoding method, including obtaining a first identifier from a bitstream, where the first identifier is used to indicate a minimum decoding time interval k between library pictures that is allowed in the bitstream, if a current decoded picture is decoded by referencing a library picture, obtaining, when parsing the bitstream, a decoding moment $t_i$ of the current decoded picture and a decoding moment $t_j$ of a first decoded picture that is closest to the current decoded picture and that references a new library picture, where the new library picture is a library picture that is not decoded or needs to be re-decoded when the first decoded picture is decoded, and determining a preset quantity of library pictures as candidate reference pictures of the current decoded picture based on a relationship between k and a difference between $t_i$ and $t_j$.

According to a second aspect, an embodiment of this application provides a decoding apparatus, including several functional units configured to implement any method in the first aspect. For example, the decoding apparatus may include a first obtaining module configured to obtain a first identifier from a bitstream, where the first identifier is used to indicate a minimum decoding time interval k between library pictures that is allowed in the bitstream, a second obtaining module configured to, if a current decoded picture is decoded by referencing a library picture, obtain, when parsing the bitstream, a decoding moment $t_i$ of the current decoded picture and a decoding moment $t_j$ of a first decoded picture that is closest to the current decoded picture and that references a new library picture, where the new library picture is a library picture that is not decoded or needs to be re-decoded when the first decoded picture is decoded, and a determining module configured to determine a preset quantity of library pictures as candidate reference pictures of the current decoded picture based on a relationship between k and a difference between $t_i$ and $t_j$.

Based on the first aspect or the second aspect, in some possible implementations, k is not less than a lower limit of the minimum decoding time interval allowed in a profile or level that the bitstream satisfies.

Based on the first aspect or the second aspect, in some possible implementations, determining a preset quantity of library pictures as candidate reference pictures of the current decoded picture based on a relationship between k and a difference between $t_i$ and $t_j$ includes, if $t_i$-$t_j$ is not less than k, determining n library pictures as the candidate reference pictures of the current decoded picture, where the n library pictures include a library picture that is currently not decoded or needs to be re-decoded, and n is a positive integer.

Based on the first aspect or the second aspect, in some possible implementations, if $t_i$-$t_j$ is not less than k, m+n library pictures are determined as the candidate reference pictures of the current decoded picture, where the m library pictures include a library picture that has been decoded, the n library pictures include a library picture that is currently not decoded or needs to be re-decoded, and m and n are positive integers.

Based on the first aspect or the second aspect, in some possible implementations, determining n library pictures as the candidate reference pictures of the current decoded picture includes determining, from library pictures that are currently not decoded or need to be re-decoded, the n library pictures having highest content similarity to the current decoded picture.

Based on the first aspect or the second aspect, in some possible implementations, determining n library pictures as the candidate reference pictures of the current decoded picture includes determining, from library pictures that are currently not decoded or need to be re-decoded, the n library pictures whose display moments are closest to a display moment of the current decoded picture.

Based on the first aspect or the second aspect, in some possible implementations, determining n library pictures as the candidate reference pictures of the current decoded picture includes determining, from library pictures that are currently not decoded or need to be re-decoded, the n library pictures having highest encoding efficiency.

Based on the first aspect or the second aspect, in some possible implementations, determining a preset quantity of library pictures as candidate reference pictures of the current decoded picture based on a relationship between k and a difference between $t_i$ and $t_j$ includes if $t_i$-$t_j$ is less than k, determining m library pictures as the candidate reference pictures of the current decoded picture, where the m library pictures include a library picture that has been decoded and does not need to be re-decoded, and m is a positive integer.

According to a third aspect, an embodiment of this application provides a video decoding method, including obtaining a first decoded picture, where the first decoded picture is a picture closest to a current to-be-decoded picture in at least one picture that is in a main bitstream, that immediately follows a sequence header, that is located before the current to-be-decoded picture, that supports random access, and that references only a library picture, and using a new library picture as a reference picture of the current to-be-decoded picture, where the current to-be-decoded picture is a picture that supports random access and that references only a library picture, and a quantity of pictures decoded between the current to-be-decoded picture and the first decoded picture in the main bitstream is at least f*k, where k is a minimum decoding time interval between library pictures that is allowed in the main bitstream, and f is a frame rate that is of a video sequence and that is claimed in the main bitstream, a quantity of new library pictures is not greater than a preset value n, where n is a positive integer, and the new library picture is a library picture that is referenced by the current to-be-decoded picture but not referenced by the first decoded picture.

According to a fourth aspect, an embodiment of this application provides a video decoding apparatus, where the apparatus includes a second obtaining module configured to obtain a first decoded picture, where the first decoded picture is a picture closest to a current to-be-decoded picture in at least one picture that is in a main bitstream, that immediately follows a sequence header, that is located before the current to-be-decoded picture, that supports random access, and that references only a library picture, and a determining module configured to use a new library picture as a reference picture of the current to-be-decoded picture, where the current to-be-decoded picture is a picture that supports random access and that references only a library picture, and a quantity of pictures decoded between the current to-be-decoded picture and the first decoded picture in the main bitstream is at least f*k, where k is a minimum decoding time interval between library pictures that is allowed in the main bitstream, and f is a frame rate that is of a video sequence and that is claimed in the main bitstream, a quantity of new library pictures is not greater than a preset value n, where n is a positive integer, and the new library picture is a library picture that is referenced by the current to-be-decoded picture but not referenced by the first decoded picture.

Based on the third aspect or the fourth aspect, in some possible implementations, the method further includes decoding the current to-be-decoded picture based on the new library picture. Correspondingly, the apparatus further includes a decoding module configured to perform this step.

Based on the third aspect or the fourth aspect, in some possible implementations, n=1.

Based on the third aspect or the fourth aspect, in some possible implementations, the new library picture is obtained by decoding a library bitstream.

According to a fifth aspect, an embodiment of this application provides a video data decoding device, where the device includes a memory configured to store video data in a form of a bitstream, and a video decoder configured to perform the method in any one of the first aspect, the third aspect, or the possible implementations of the first aspect or the third aspect.

According to a sixth aspect, an embodiment of this application provides a video data encoding device, where the device includes a memory configured to store video data, where the video data includes one or more picture blocks, and a video encoder configured to perform the method in any one of the first aspect, the third aspect, or the possible implementations of the first aspect or the third aspect.

According to a seventh aspect, an embodiment of this application provides an encoding device, including a non-volatile memory and a processor that are coupled to each other. The processor invokes program code stored in the memory, to perform some or all steps of any method in the first aspect.

According to an eighth aspect, an embodiment of this application provides a decoding device, including a non-volatile memory and a processor that are coupled to each other. The processor invokes program code stored in the memory, to perform some or all steps of any method in the first aspect.

According to a ninth aspect, an embodiment of this application provides a computer-readable storage medium. The computer-readable storage medium stores program code, and the program code includes instructions used to perform some or all steps of any method in the first aspect.

According to a tenth aspect, an embodiment of this application provides a computer program product. When the computer program product runs on a computer, the computer is enabled to perform some or all steps of any method in the first aspect.

It should be understood that possible implementations of any aspect of this application may be randomly combined provided that a law of nature is followed, and implementation methods in some corresponding feasible implementations are similar. Therefore, similar beneficial effects are achieved, and details are not described again.

It can be learned that, in the embodiments of the present disclosure, a decoding peak can be reduced.

BRIEF DESCRIPTION OF DRAWINGS

To describe the technical solutions in the embodiments of the present disclosure more clearly, the following describes the accompanying drawings that need to be used in the embodiments of the present disclosure.

DESCRIPTION OF EMBODIMENTS

Figure 1A:
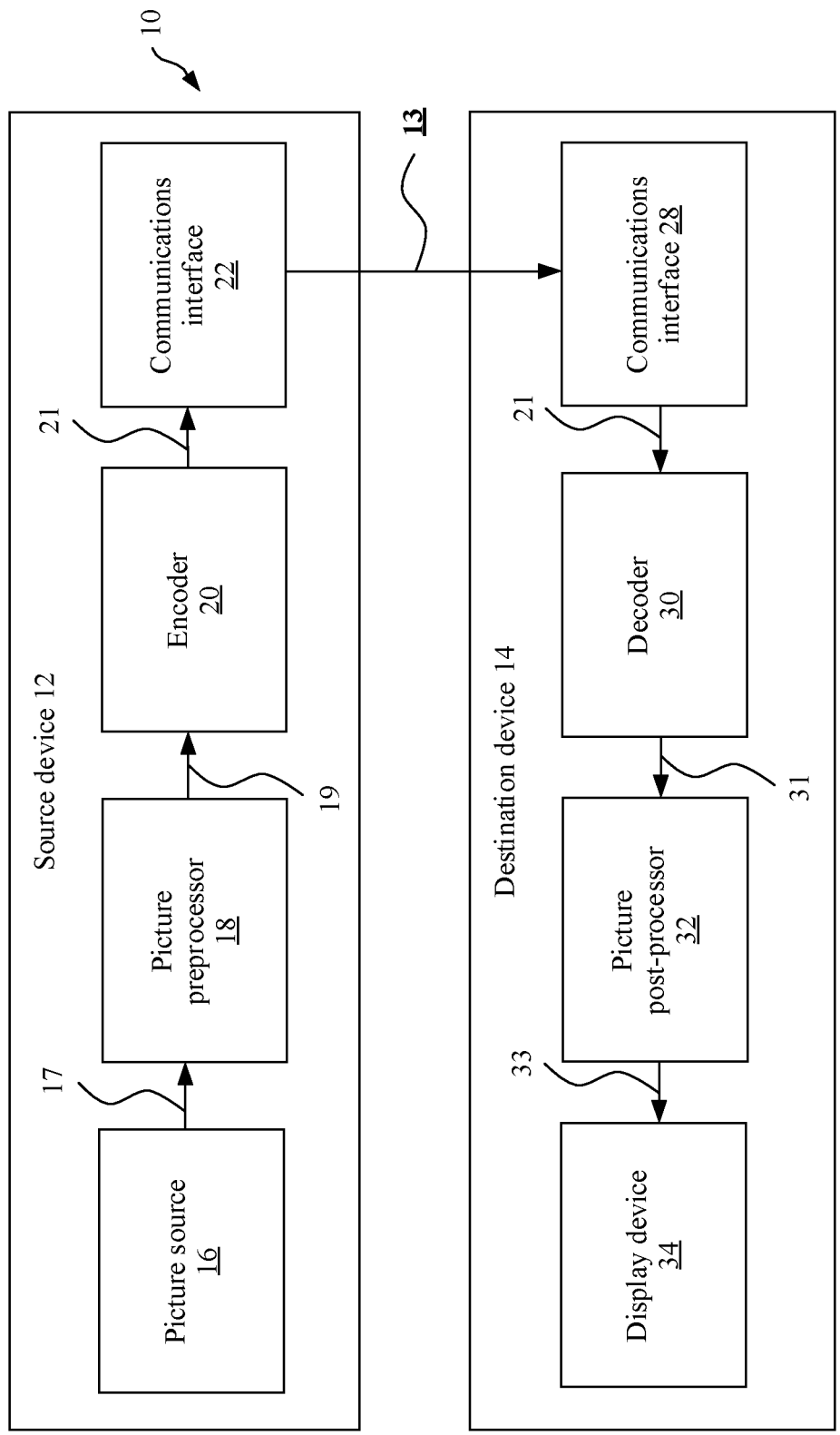
FIG. 1A is a block diagram of an example of a video encoding and decoding system for implementing the embodiments of the present disclosure.

The following describes the embodiments of the present disclosure with reference to the accompanying drawings in the embodiments of the present disclosure. In the following descriptions, reference is made to the accompanying drawings that form a part of this disclosure and show, by way of illustration, specific aspects of the embodiments of the present disclosure or specific aspects in which the embodiments of the present disclosure may be used. It should be understood that the embodiments of the present disclosure may be used in other aspects, and may include structural or logical changes not depicted in the accompanying drawings. Therefore, the following detailed descriptions shall not be understood in a limiting sense, and the scope of the present disclosure is defined by the appended claims. For example, it should be understood that disclosed content with reference to described methods is also applicable to a corresponding device or system configured to perform the method, and vice versa. For example, if one or more specific method steps are described, a corresponding device may include one or more units such as functional units for performing the described one or more method steps (for example, one unit performs the one or more steps, or a plurality of units, each of which performs one or more of the plurality of steps), even if such one or more units are not explicitly described or illustrated in the accompanying drawings. In addition, for example, if a specific apparatus is described based on one or more units such as a functional unit, a corresponding method may include a step used to perform one or more functionalities of one or more units (for example, one step used to perform one or more functionalities of one or more units, or a plurality of steps, each of which is used to perform one or more functionalities of one or more units in a plurality of units), even if such one or more of steps are not explicitly described or illustrated in the accompanying drawings. Further, it should be understood that features of the various example embodiments and/or aspects described in this specification may be combined with each other, unless otherwise specified.

The technical solutions in the embodiments of the present disclosure may not only be applied to an existing video coding standard (such as H.264 or HEVC), but also be applied to a future video coding standard (such as H.266). Terms used in implementations of the present disclosure are merely intended to explain specific embodiments of the present disclosure, and are not intended to limit the present disclosure. The following first briefly describes some concepts that may be used in the embodiments of the present disclosure.

Video coding usually refers to processing of a sequence of pictures that form a video or a video sequence. In the field of video coding, the terms "picture", "frame", and "image" may be used as synonyms. Video coding in this specification represents video encoding or video decoding. Video encoding is performed on a source side, and usually includes processing (for example, by compression) an original video picture to reduce an amount of data required for representing the video picture, for more efficient storage and/or transmission. Video decoding is performed on a destination side, and typically includes inverse processing relative to an encoder to reconstruct a video picture. "Coding" of a video picture in the embodiments should be understood as "encoding" or "decoding" of a video sequence. A combination of an encoding part and a decoding part is also referred to as codec (i.e., encoding and decoding).

A video sequence includes a series of pictures, a picture is further split into slices, and a slice is further split into blocks. Video coding is performed by block. In some new video coding standards, the concept "block" is further expanded. For example, in the H.264 standard, there is a macroblock (MB), and the macroblock may be further split into a plurality of prediction blocks that can be used for predictive coding. In the HEVC standard, a plurality of block units are classified by functions according to basic concepts such as coding unit (CU), prediction unit (PU), and transform unit (TU), and are described by using a new tree-based structure. For example, a CU may be split into smaller CUs based on a quadtree, and the smaller CU may be further split, to generate a quadtree structure. The CU is a basic unit for splitting and encoding a coded picture. A PU and a TU also have similar tree structures. The PU may correspond to a prediction block, and is a basic unit for predictive coding. The CU is further split into a plurality of PUs in a split mode. The TU may correspond to a transform block, and is a basic unit for transforming a prediction residual. However, in essence, all of the CU, the PU, and the TU are concepts of blocks (or picture blocks).

For example, in HEVC, a coding tree unit (CTU) is split into a plurality of CUs by using a quadtree structure represented as a coding tree. A decision on whether to encode a picture area by using inter-picture (temporal) or intra-picture (spatial) prediction is made at a CU level. Each CU may be further split into one, two, or four PUs based on a PU split pattern. In one PU, a same prediction process is applied, and related information is transmitted to a decoder on a PU basis. After a residual block is obtained by applying the prediction process based on the PU split pattern, the CU may be partitioned into transform units (TU) based on another quadtree structure similar to the coding tree used for the CU. In the recent development of video compression technologies, a quadtree plus binary tree (QTBT) partition frame is used to partition a coding block. In a QTBT block structure, the CU may be square or rectangular.

In this specification, for ease of description and understanding, a to-be-coded picture block in a current coded picture may be referred to as a current block. For example, in encoding, the current block is a block that is currently being encoded, and in decoding, the current block is a block that is currently being decoded. A decoded picture block, in a reference picture, used to predict the current block is referred to as a reference block. In other words, a reference block is a block that provides a reference signal for the current block. The reference signal represents a pixel value in the picture block. A block that is in the reference picture and that provides a prediction signal for the current block may be referred to as a prediction block. The prediction signal represents a pixel value, a sampling value, or a sampling signal in the prediction block. For example, after traversal of a plurality of reference blocks, an optimal reference block is found. The optimal reference block provides prediction for the current block, and this block is referred to as a prediction block.

In a case of lossless video coding, the original video picture may be reconstructed. To be specific, a reconstructed video picture has same quality as the original video picture (assuming that no transmission loss or other data loss occurs during storage or transmission). In a case of lossy video coding, further compression is performed through, for example, quantization, to reduce an amount of data required for representing the video picture, and the video picture cannot be completely reconstructed on the decoder side. To be specific, quality of reconstructed video picture is lower or poorer than quality of the original video picture.

Several H.261 video coding standards are for "lossy hybrid video coding" (to be specific, spatial and temporal prediction in a sample domain is combined with two-dimensional (2D) transform coding for applying quantization in a transform domain). Each picture of a video sequence is usually partitioned into a set of non-overlapping blocks, and coding is usually performed at a block level. In other words, on the encoder side, a video is usually processed, that is, encoded, at a block (video block) level. For example, a prediction block is generated through spatial (intra-picture) prediction and temporal (inter-picture) prediction, the prediction block is subtracted from a current block (a block being processed or to be processed) to obtain a residual block, and the residual block is transformed in the transform domain and quantized to reduce an amount of data that is to be transmitted (compressed). On the decoder side, inverse processing relative to the encoder is performed on an encoded block or a compressed block to reconstruct the current block for representation. Furthermore, the encoder duplicates a processing loop of the decoder, so that the encoder and the decoder generate same prediction (for example, intra prediction and inter prediction) and/or reconstruction for processing, that is, for coding a subsequent block.

The following describes a system architecture used in the embodiments of the present disclosure. FIG. 1A is a schematic block diagram of an example of a video encoding and decoding system 10 according to an embodiment of the present disclosure. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a random-access memory (RAM), a read-only memory (ROM), an electrically erasable programmable ROM (EEPROM), a flash memory, or any other medium that can be used to store desired program code in a form of an instruction or a data structure accessible to a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, a vehicle-mounted computer, a wireless communications device, or the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented over a link 13, and the destination device 14 may receive encoded video data from the source device 12 over the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission cables. The one or more communications media may be a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20. Optionally, the source device 12 may further include a picture source 16, a picture preprocessor 18, and a communications interface 22. In a specific implementation, the encoder 20, the picture source 16, the picture preprocessor 18, and the communications interface 22 may be hardware components in the source device 12, or may be software programs in the source device 12. Descriptions are separately provided as follows The picture source 16 may include or be any type of picture capturing device configured to, for example, capture a real-world picture, and/or any type of device for generating a picture or a comment (for screen content encoding, some text on a screen is also considered as a part of a to-be-encoded picture or image), for example, a computer graphics processor configured to generate a computer animation picture, or any type of device configured to obtain and/or provide a real-world picture or a computer animation picture (for example, screen content or a virtual reality (VR) picture), and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a 2D array or matrix of picture elements (picture element). The picture element in the array may also be referred to as a sample. Quantities of samples in horizontal and vertical directions (or axes) of the array or the picture define a size and/or resolution of the picture. For representation of a color, typically three color components are used. To be specific, the picture may be represented as or include three sample arrays. For example, in a red, green, and blue (RGB) format or color space, the picture includes corresponding red, green, and blue sample arrays. However, in video coding, each pixel is usually represented in a luma/chroma format or color space. For example, a picture in a YUV format includes a luma component indicated by Y (sometimes indicated by L instead) and two chroma components indicated by U and V. The luminance (luma) component Y represents brightness or gray level intensity (for example, both are the same in a gray-scale picture), and the two chrominance (chroma) components U and V represent chroma or color information components. Correspondingly, the picture in the YUV format includes a luma sample array of luma sample values (Y) and two chroma sample arrays of chroma values (U and V). A picture in an RGB format may be transformed or converted into a YUV format and vice versa. This process is also referred to as color conversion or transformation. If a picture is monochrome, the picture may include only a luma sample array. In this embodiment of the present disclosure, a picture transmitted by the picture source 16 to a picture processor may also be referred to as original picture data 17.

The picture preprocessor 18 is configured to receive the original picture data 17 and perform preprocessing on the original picture data 17 to obtain a preprocessed picture 19 or preprocessed picture data 19. For example, the preprocessing performed by the picture preprocessor 18 may include trimming, color format conversion (for example, from an RGB format to a YUV format), color correction, or de-noising.

The encoder 20 (or referred to as a video encoder 20) is configured to receive the preprocessed picture data 19, and process the preprocessed picture data 19 in a related prediction mode (for example, a prediction mode in the embodiments of this specification), to provide encoded picture data 21 (details of a structure of the encoder 20 are further described below based on FIG. 2, FIG. 4, or FIG. 5). In some embodiments, the encoder 20 may be configured to perform each embodiment described below, to implement encoder-side application of a video picture coding method described in the present disclosure.

The communications interface 22 may be configured to receive the encoded picture data 21, and transmit the encoded picture data 21 to the destination device 14 or any other device (for example, a memory) over the link 13 for storage or direct reconstruction. The any other device may be any device used for decoding or storage. The communications interface 22 may be, for example configured to package the encoded picture data 21 in an appropriate format, for example, into a data packet for transmission over the link 13.

The destination device 14 includes a decoder 30. Optionally, the destination device 14 may further include a communications interface 28, a picture post-processor 32, and a display device 34. Descriptions are separately provided as follows.

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 over the link 13 between the source device 12 and the destination device 14 or over any type of network. The link 13 is, for example, a direct wired or wireless connection. The any type of network is, for example, a wired or wireless network or any combination thereof, or any type of private or public network, or any combination thereof. The communications interface 28 may be, for example configured to depackage the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to establish a connection, and acknowledge and exchange any other information related to a communication link and/or data transmission such as encoded picture data transmission.

The decoder 30 is configured to receive the encoded picture data 21 and provide decoded picture data 31 or a decoded picture 31 (details of a structure of the decoder 30 are further described below based on FIG. 3, FIG. 4, or FIG. 5). In some embodiments, the decoder 30 may be configured to perform each embodiment described below, to implement decoder-side application of a video picture coding method described in the present disclosure.

The picture post-processor 32 is configured to post-process the decoded picture data 31 (or reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture to, for example, a user or a viewer. The display device 34 may be or may include any type of display for presenting a reconstructed picture, for example, an integrated or external display or monitor. For example, the display may include a liquid-crystal display (LCD), an organic light-emitting diode (LED) (OLED) display, a plasma display, a projector, a micro LED display, a liquid crystal on silicon (LCoS), a digital light processor (DLP), or any types of other displays.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

Based on the descriptions, a person skilled in the art can definitely learn that existence and (exact) division of functionalities of different units or functionalities of the source device 12 and/or the destination device 14 shown in FIG. 1A may vary depending on an actual device and application. The source device 12 and the destination device 14 may include any of a wide range of devices, including any type of handheld or stationary device, for example, a notebook or laptop computer, a mobile phone, a smartphone, a tablet or a tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any one of various appropriate circuits, for example, one or more microprocessors, digital signal processors (DSPs), application-specific integrated circuits (ASICs), field-programmable gate arrays (FPGAs), discrete logic, hardware, or any combination thereof. If the technologies are implemented partially by using software, a device may store software instructions in an appropriate non-transitory computer-readable storage medium and may execute the instructions by using hardware such as one or more processors, to perform the technologies of this disclosure. Any of the foregoing content (including hardware, software, a combination of hardware and software, and the like) may be considered as one or more processors.

In some cases, the video encoding and decoding system 10 shown in FIG. 1A is merely an example, and the technologies of this application are applicable to video coding settings (for example, video encoding or video decoding) that do not necessarily include any data communication between an encoding device and a decoding device. In other examples, data may be retrieved from a local memory, streamed over a network, or the like. A video encoding device may encode data and store the data to a memory, and/or a video decoding device may retrieve data from the memory and decode the data. In some examples, encoding and decoding are performed by devices that do not communicate with each other but only encode data to a memory and/or retrieve data from the memory and decode the data.

Figure 1B:
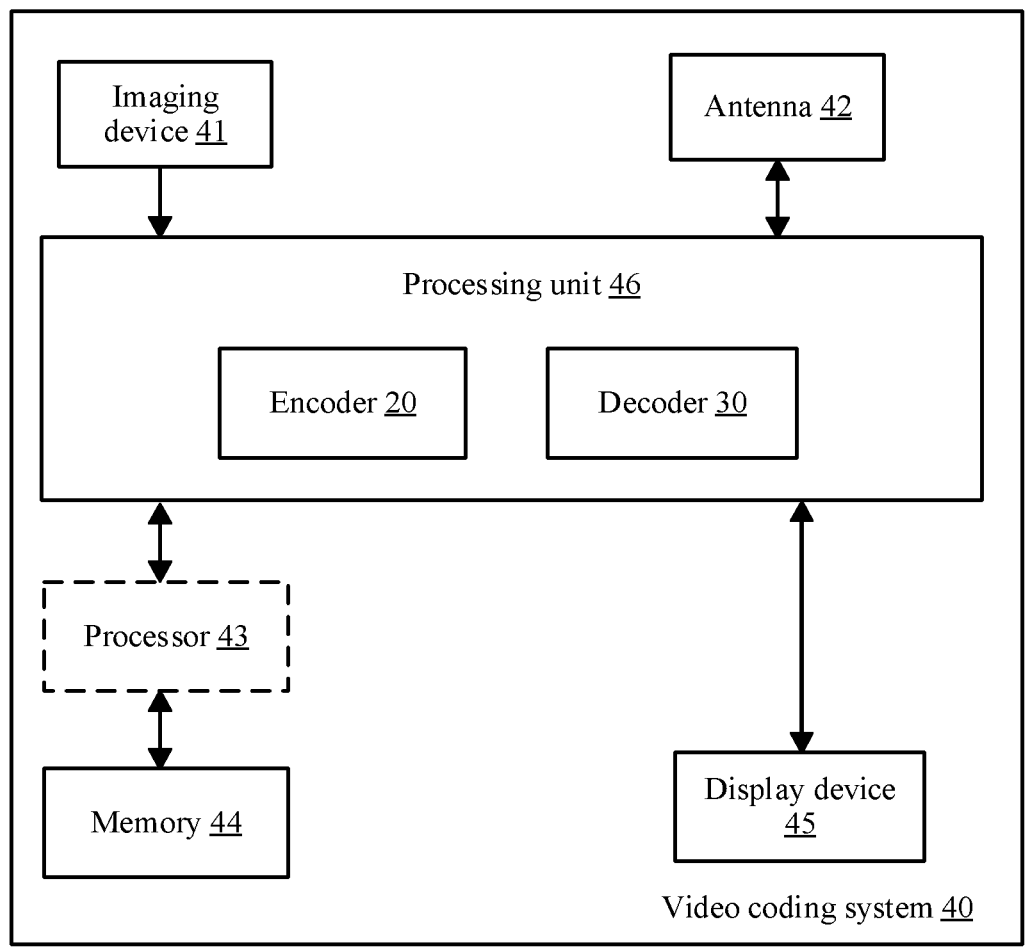
FIG. 1B is a block diagram of an example of a video coding system for implementing the embodiments of the present disclosure.
Figure 2:
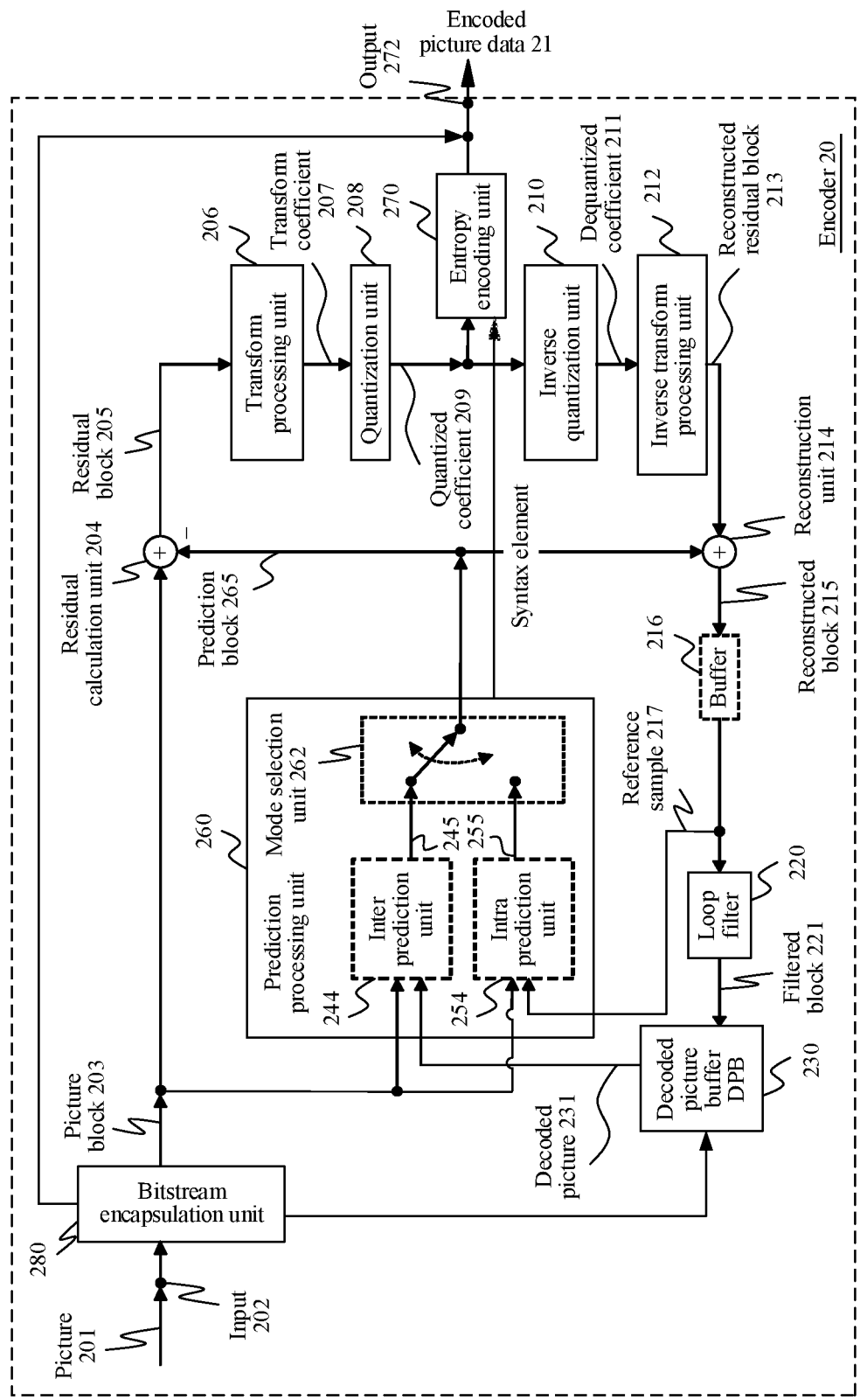
FIG. 2 is a block diagram of an example structure of an encoder for implementing the embodiments of the present disclosure.
Figure 3:
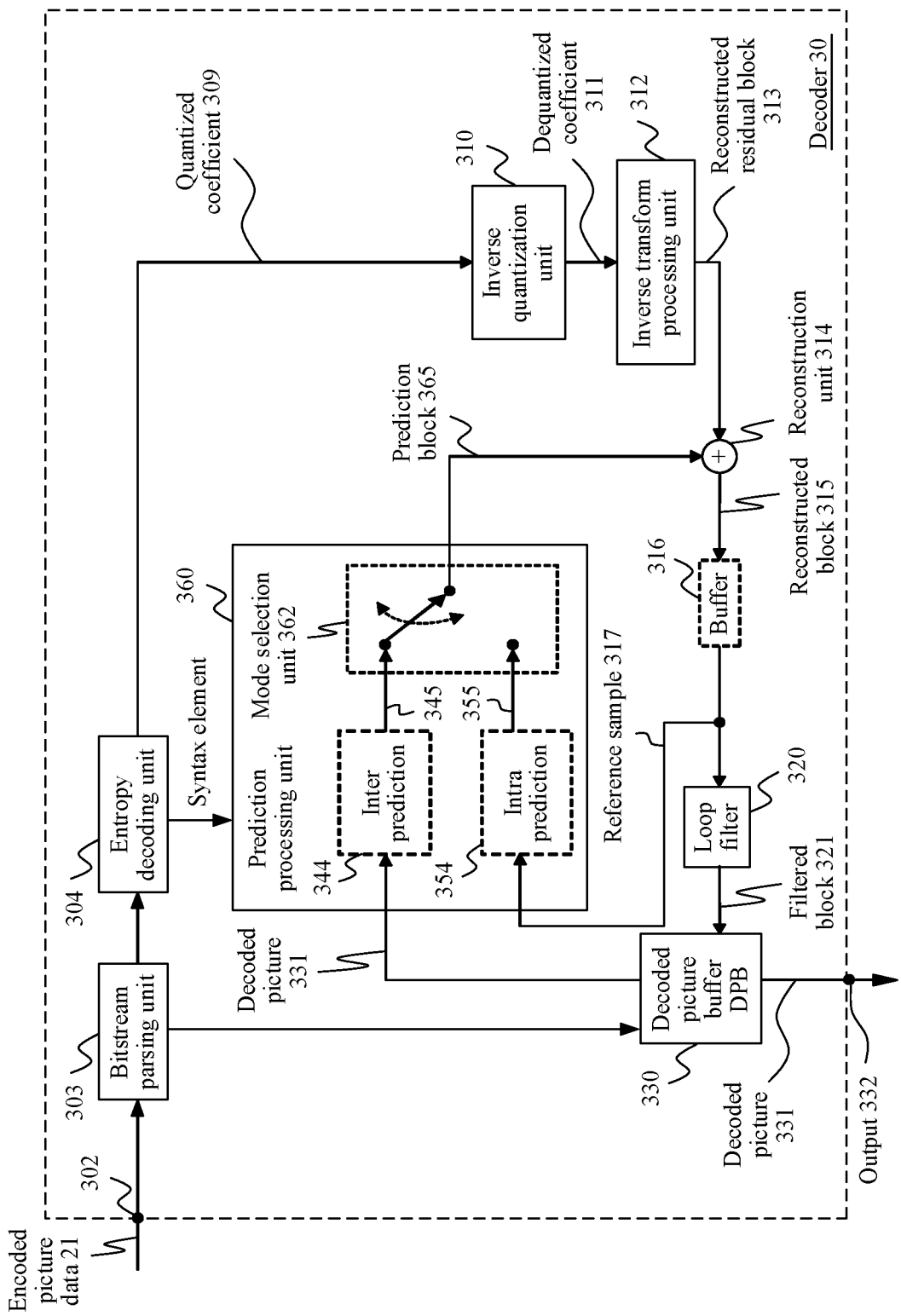
FIG. 3 is a block diagram of an example structure of a decoder for implementing the embodiments of the present disclosure.

FIG. 1B is an illustrative diagram of an example of a video coding system 40 including an encoder 20 in FIG. 2 and/or a decoder 30 in FIG. 3 according to an example embodiment. The video coding system 40 can implement a combination of various technologies in the embodiments of the present disclosure. In the illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with both the encoder 20 and the decoder 30, in different examples, the video coding system 40 may include only the encoder 20 or only the decoder 30.

In some examples, the antenna 42 may be configured to transmit or receive an encoded bitstream of video data. In addition, in some examples, the display device 45 may be configured to present the video data. In some examples, the logic circuit 47 may be implemented by the processing unit 46. The processing unit 46 may include ASIC logic, a graphics processor, a general-purpose processor, and the like. The video coding system 40 may also include the optional processor 43. The optional processor 43 may similarly include ASIC logic, a graphics processor, a general-purpose processor, and the like. In some examples, the logic circuit 47 may be implemented by hardware, for example, video coding dedicated hardware, and the processor 43 may be implemented by using general-purpose software, an operating system, or the like. In addition, the memory 44 may be any type of memory, for example, a volatile memory (for example, a static RAM (SRAM), a dynamic RAM (DRAM)), or a nonvolatile memory (for example, a flash memory). In a non-limitative example, the memory 44 may be implemented as a cache memory. In some examples, the logic circuit 47 may access the memory 44 (for example, for implementing a picture buffer). In other examples, the logic circuit 47 and/or the processing unit 46 may include a memory (for example, a cache) for implementing a picture buffer or the like.

In some examples, the encoder 20 implemented by the logic circuit may include a picture buffer (for example, implemented by the processing unit 46 or the memory 44) and a graphics processing unit (for example, implemented by the processing unit 46). The graphics processing unit may be communicatively coupled to the picture buffer. The graphics processing unit may include the encoder 20 implemented by the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by the logic circuit may include a picture buffer (implemented by the processing unit 46 or the memory 44) and a graphics processing unit (for example, implemented by the processing unit 46). The graphics processing unit may be communicatively coupled to the picture buffer. The graphics processing unit may include the decoder 30 implemented by the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, and the like related to video frame encoding described in this specification, for example, data related to coding partitioning (for example, a transform coefficient or a quantized transform coefficient, an optional indicator (as described), and/or data that defines the coding partitioning). The video coding system 40 may further include the decoder 30 coupled to the antenna 42 and configured to decode the encoded bitstream. The display device 45 is configured to present a video frame.

It should be understood that, in this embodiment of the present disclosure, relative to the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy encode the syntax element into an encoded video bitstream. In such examples, the decoder 30 may parse the syntax element and correspondingly decode related video data.

It should be noted that a coding method described in the embodiments of the present disclosure is mainly used in an inter prediction process, and the process exists on both the encoder 20 and the decoder 30. The encoder 20 and the decoder 30 in this embodiment of the present disclosure may be, for example, an encoder/decoder corresponding to a video standard protocol such as H.263, H.264, HEVC, MPEG-2, MPEG-4, VP8, or VP9, or corresponding to a next-generation video standard protocol (such as H.266).

FIG. 2 is a schematic/conceptual block diagram of an example of an encoder 20 for implementing the embodiments of the present disclosure. In the example in FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the DPB 230, and the prediction processing unit 260 form a backward signal path of the encoder. The backward signal path of the encoder corresponds to a signal path of a decoder (refer to a decoder 30 in FIG. 3).

The encoder 20 receives, for example, via an input 202, a picture 201 or a picture block 203 of the picture 201, for example, a picture in a sequence of pictures forming a video or a video sequence. The picture block 203 may also be referred to as a current picture block or a to-be-encoded picture block, and the picture 201 may be referred to as a current picture or a to-be-encoded picture (particularly in video coding, for distinguishing the current picture from other pictures, for example, previously encoded and/or decoded pictures in a same video sequence, namely, the video sequence that also includes the current picture).

In an embodiment, the encoder 20 may include a partitioning unit (not shown in FIG. 2) configured to partition the picture 201 into a plurality of blocks such as picture blocks 203. The picture 201 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning technologies described above.

Like the picture 201, the picture block 203 is also or may be considered as a two-dimensional array or matrix of samples with sample values, although a size of the picture block 203 is smaller than a size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. Quantities of samples in horizontal and vertical directions (or axes) of the picture block 203 define a size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (other details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. In comparison with an orthogonal DCT, such an integer approximation is typically scaled by a factor. To preserve a norm of a residual block which is processed by using forward and inverse transforms, applying an additional scaling factor is a part of a transform process. The scaling factor is usually selected based on some constraints. For example, the scaling factor is a power of two for a shift operation, a bit depth of the transform coefficient, or a tradeoff between accuracy and implementation costs. For example, a specific scaling factor is specified for the inverse transform by, for example, the inverse transform processing unit 212 on the decoder side 30 (and a corresponding inverse transform by, for example, the inverse transform processing unit 212 on the encoder side 20), and correspondingly, a corresponding scaling factor may be specified for the forward transform by the transform processing unit 206 on the encoder side 20.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An applicable quantization step may be indicated by the QP. For example, the quantization parameter may be an index to a predefined set of applicable quantization steps. For example, a smaller quantization parameter may correspond to finer quantization (a smaller quantization step), and a larger quantization parameter may correspond to coarser quantization (a larger quantization step), or vice versa. The quantization may include division by a quantization step and corresponding quantization or inverse quantization, for example, performed by the inverse quantization unit 210, or may include multiplication by a quantization step. In embodiments according to some standards such as HEVC, a quantization parameter may be used to determine the quantization step. Generally, the quantization step may be calculated based on a quantization parameter by using a fixed point approximation of an equation including division. An additional scaling factor may be introduced for quantization and dequantization to restore the norm of the residual block, where the norm of the residual block may be modified because of a scale used in the fixed point approximation of the equation for the quantization step and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where a loss increases with an increasing quantization step.

The inverse quantization unit 210 is configured to apply inverse quantization of the quantization unit 208 to a quantization coefficient to obtain a dequantized coefficient 211, for example, apply, based on or by using a same quantization step as the quantization unit 208, the inverse of a quantization scheme applied by the quantization unit 208. The dequantized coefficient 211 may also be referred to as a dequantized residual coefficient 211 and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse DCT or an inverse DST, to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, the reconstructed residual block 213) to the prediction block 265, for example, by adding sample values of the reconstructed residual block 213 and the sample values of the prediction block 265, to obtain a reconstructed block 215 in the sample domain.

Optionally, a buffer unit 216 (or briefly referred to as a "buffer" 216) of, for example, the line buffer 216, is configured to buffer or store the reconstructed block 215 and a corresponding sample value, for example, for intra prediction. In other embodiments, the encoder may be configured to use an unfiltered reconstructed block and/or a corresponding sample value that are/is stored in the buffer unit 216, for any type of estimation and/or prediction, for example, intra prediction.

For example, in an embodiment, the encoder 20 may be configured so that the buffer unit 216 is configured to store the reconstructed block 215 not only used for intra prediction 254 but also used for the loop filter unit 220, and/or so that, for example, the buffer unit 216 and the decoded picture buffer unit 230 form one buffer. In other embodiments, a filtered block 221 and/or a block or sample from the decoded picture buffer 230 (the block or the sample is not shown in FIG. 2) are/is used as an input or a basis for the intra prediction unit 254. The decoded picture buffer 230 is further configured to store a library picture. A library is to be described in detail below, and therefore details are not described herein.

The loop filter unit 220 (or briefly referred to as a "loop filter" 220) is configured to filter the reconstructed block 215 to obtain the filtered block 221, to smooth pixel transition or improve video quality. The loop filter unit 220 is intended to represent one or more loop filters including, for example, a deblocking filter, a sample-adaptive offset (SAO) filter, or another filter, for example, a bilateral filter, an adaptive loop filter (ALF), a sharpening or smoothing filter, or a collaborative filter. Although the loop filter unit 220 is shown as an in-loop filter in FIG. 2, in other configurations, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that, for example, the decoder 30 can receive and apply the same loop filter parameter for decoding.

The DPB 230 may be a reference picture memory that stores reference picture data for use in encoding video data by the encoder 20. The DPB 230 may be formed by any one of a variety of memory devices such as a DRAM (including a synchronous DRAM (SDRAM), a magnetoresistive RAM (MRAM), and a resistive RAM (RRAM)), or another type of memory device. The DPB 230 and the buffer 216 may be provided by a same memory device or separate memory devices. In an example, the DPB 230 is configured to store the filtered block 221. The decoded picture buffer 230 may be further configured to store another previously filtered block, for example, a previously reconstructed and filtered block 221, of the same current picture or of a different picture, for example, a previously reconstructed picture, and may provide a complete previously reconstructed, namely, decoded, picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (decoded picture buffer, DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (RDO), that is, select a prediction mode that provides a minimum rate distortion or select a prediction mode for which related rate distortion at least satisfies a prediction mode selection criterion.

The following describes in detail prediction processing performed (for example, by the prediction processing unit 260) and mode selection performed (for example, by the mode selection unit 262) in an example of the encoder 20.

As described above, the encoder 20 is configured to determine or select an optimal or optimum prediction mode from a set of (pre-determined) prediction modes. The set of prediction modes may include, for example, an intra prediction mode and/or an inter prediction mode.

A set of intra prediction modes may include 35 different intra prediction modes, for example, non-directional modes such as a direct current (DC) (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In a possible implementation, a set of inter prediction modes depends on available reference pictures (namely, for example, at least some decoded pictures stored in the DBP 230, as described above) and other inter prediction parameters, for example, depends on whether an entire reference picture or only a part of the reference picture, for example, a search window region around a region of the current block, is used for searching for an optimal matched reference block, and/or for example, depends on whether pixel interpolation such as half-pixel and/or quarter-pixel interpolation is applied. The set of inter prediction modes may include, for example, an advanced motion vector prediction (AMVP) mode and a merge mode. In specific implementation, the set of inter prediction modes may include an improved control point-based AMVP mode and an improved control point-based merge mode in the embodiments of the present disclosure. In an example, the intra prediction unit 254 may be configured to perform any combination of inter prediction technologies described below.

In addition to the foregoing prediction modes, a skip mode and/or a direct mode may also be used in the embodiments of the present disclosure.

The prediction processing unit 260 may be further configured to partition the picture block 203 into smaller block partitions or subblocks, for example, by iteratively using quadtree (QT) partitioning, binary tree (BT) partitioning, triple tree (TT) partitioning, or any combination thereof, and perform, for example, prediction on each of the block partitions or subblocks. Mode selection includes selection of a tree structure of the partitioned picture block 203 and selection of a prediction mode used for each of the block partitions or subblocks.

The inter prediction unit 244 may include a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and the previously decoded picture 231, or in other words, the current picture and the previously decoded picture 231 may be a part of or form a sequence of pictures forming the video sequence.

For example, the encoder 20 may be configured to select a reference block from a plurality of reference blocks of a same picture or different pictures in a plurality of other pictures, and provide, for the motion estimation unit (not shown in FIG. 2), a reference picture and/or provide an offset (a spatial offset) between a location (coordinates X and Y) of the reference block and a location of the current block as an inter prediction parameter. This offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include extracting or generating a prediction block based on a motion/block vector determined through motion estimation (interpolation may be performed to sub-pixel precision). Interpolation filtering may generate an additional pixel sample from a known pixel sample. This potentially increases a quantity of candidate prediction blocks that may be used to encode a picture block. Upon receiving a motion vector for a PU of the current picture block, the motion compensation unit may locate a prediction block to which the motion vector points in one reference picture list. The motion compensation unit may further generate syntax elements associated with a block and a video slice, for decoding a picture block in the video slice by the decoder 30.

Further, the inter prediction unit 244 may transmit the syntax elements to the entropy encoding unit 270. The syntax elements include the inter prediction parameter (such as indication information of selection of an inter prediction mode used for prediction of the current block after traversal of a plurality of inter prediction modes). In a possible application scenario, if there is only one inter prediction mode, the inter prediction parameter may alternatively not be carried in the syntax elements. In this case, the decoder side 30 may directly perform decoding in a default prediction mode. It may be understood that the inter prediction unit 244 may be configured to perform any combination of inter prediction technologies.

The intra prediction unit 254 is configured to obtain, for example, receive, the picture block 203 (the current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra prediction mode for a block, the intra prediction unit 254 is further configured to provide an intra prediction parameter, that is, information indicating the selected intra prediction mode for the block, for the entropy encoding unit 270. In an example, the intra prediction unit 254 may be configured to perform any combination of intra prediction technologies.

Further, the intra prediction unit 254 may transmit syntax elements to the entropy encoding unit 270. The syntax elements include the intra prediction parameter (such as indication information of selection of an intra prediction mode used for prediction of the current block after traversal of a plurality of intra prediction modes). In a possible application scenario, if there is only one intra prediction mode, the intra prediction parameter may alternatively not be carried in the syntax elements. In this case, the decoder side 30 may directly perform decoding in a default prediction mode.

The entropy encoding unit 270 is configured to apply (or skip applying) an entropy encoding algorithm or scheme (for example, a variable length coding (VLC) scheme, a context-adaptive VLC (CAVLC) scheme, an arithmetic coding scheme, a context-adaptive binary arithmetic coding (CABAC) scheme, a syntax-based CABAC (SBAC) scheme, a probability interval partitioning entropy (PIPE) coding scheme, or another entropy coding methodology or technology) on one or all of the following: the quantized residual coefficient 209, the inter prediction parameter, the intra prediction parameter, and/or the loop filter parameter, to obtain encoded picture data 21 that may be output through an output 272, for example, in a form of an encoded bitstream 21. The encoded bitstream may be transmitted to the video decoder 30, or archived for later transmission or retrieval by the video decoder 30. The entropy encoding unit 270 may be further configured to entropy encode another syntax element for a current video slice that is being encoded.

A bitstream encapsulation unit 280 is configured to, when determining that a library picture referenced by a current to-be-processed picture and the current to-be-processed picture are a same picture, encode encoding information (for example, a first identifier, a second identifier, and a third identifier) into a bitstream (a main bitstream/a sequence stream), where the encoding information is related to how to reference the library picture during determining of decoding the current to-be-processed picture, and directly output the current picture through the output 272, or when determining that a reference picture of a current to-be-processed picture and the current to-be-processed picture are different pictures, output the current picture to the residual calculation unit 204.

Other structural variations of the video encoder 20 may be used to encode a video stream. For example, a non-transform based encoder 20 may directly quantize a residual signal without the transform processing unit 206 for some blocks or frames. In another implementation, the encoder 20 may have the quantization unit 208 and the inverse quantization unit 210 combined into a single unit.

Further, in this embodiment of the present disclosure, the encoder 20 may be configured to implement a coding method described in the following embodiments.

It should be understood that other structural variations of the video encoder 20 may be used to encode a video stream. For example, for some picture blocks or picture frames, the video encoder 20 may directly quantize a residual signal, processing by the transform processing unit 206 is not required, and correspondingly, processing by the inverse transform processing unit 212 is not required either. Alternatively, for some picture blocks or picture frames, the video encoder 20 does not generate residual data, and correspondingly, processing by the transform processing unit 206, the quantization unit 208, the inverse quantization unit 210, and the inverse transform processing unit 212 is not required. Alternatively, the video encoder 20 may directly store a reconstructed picture block as a reference block, and processing by the filter 220 is not required. Alternatively, the quantization unit 208 and the inverse quantization unit 210 of the video encoder 20 may be combined. The loop filter 220 is optional. In addition, in a case of lossless compression coding, the transform processing unit 206, the quantization unit 208, the inverse quantization unit 210, and the inverse transform processing unit 212 are also optional. It should be understood that, in different application scenarios, the inter prediction unit 244 and the intra prediction unit 254 may be selectively enabled.

FIG. 3 is a schematic/conceptual block diagram of an example of a decoder 30 for implementing the embodiments of the present disclosure. The video decoder 30 is configured to receive encoded picture data (for example, an encoded bitstream) 21 encoded by, for example, the encoder 20, to obtain a decoded picture 331. In a decoding process, the video decoder 30 receives video data from the video encoder 20, for example, an encoded video bitstream that represents a picture block in an encoded video slice and an associated syntax element.

In the example in FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding process that is roughly inverse to the encoding process described with reference to the video encoder 20 in FIG. 2.

The entropy decoding unit 304 is configured to entropy decode the encoded picture data 21 to obtain, for example, a quantized coefficient 309 and/or a decoded encoding parameter (not shown in FIG. 3), for example, any one or all of the following an inter prediction parameter, an intra prediction parameter, a loop filter parameter, and/or another syntax element (that are decoded). The entropy decoding unit 304 is further configured to forward the inter prediction parameter, the intra prediction parameter, and/or the other syntax element to the prediction processing unit 360. The video decoder 30 may receive syntax elements at a video slice level and/or a picture block level.

The inverse quantization unit 310 may have a same function as the inverse quantization unit 210. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may resemble the inter prediction unit 244 in function, and the intra prediction unit 354 may resemble the intra prediction unit 254 in function. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded into an intra-encoded (I) slice, the intra prediction unit 354 of the prediction processing unit 360 is configured to generate the prediction block 365 for a picture block in the current video slice based on a signaled intra prediction mode and data that is from a previously decoded block of a current frame or picture. When a video slice is encoded as an inter-encoded (B or P) slice, the inter prediction unit 344 (for example, a motion compensation unit) of the prediction processing unit 360 is configured to generate the prediction block 365 for a video block in the current video slice based on a motion vector and another syntax element that is received from the entropy decoding unit 304. For inter prediction, the prediction block may be generated from one of reference pictures in one reference picture list. The video decoder 30 may construct reference frame lists: a list 0 and a list 1, by using a default construction technology based on reference pictures stored in the DPB 330.

The prediction processing unit 360 is configured to determine prediction information for the video block in the current video slice by parsing the motion vector and the other syntax element, and use the prediction information to generate the prediction block for the current video block that is being decoded. In an example of the present disclosure, the prediction processing unit 360 determines, by using some received syntax elements, a prediction mode (for example, intra or inter prediction) for encoding the video block in the video slice, an inter prediction slice type (for example, a B slice, a P slice, or a generalized P/B (GPB) slice), construction information of one or more of the reference picture lists for the slice, a motion vector for each inter-encoded video block in the slice, an inter prediction status of each inter-encoded video block in the slice, and other information, to decode the video block in the current video slice. In another example of this disclosure, the syntax elements received by the video decoder 30 from a bitstream include syntax elements in one or more of an adaptive parameter set (APS), a sequence parameter set (SPS), a picture parameter set (PPS), or a slice header.

The inverse quantization unit 310 may be configured to perform inverse quantization (namely, dequantization) on a quantized transform coefficient provided in the bitstream and decoded by the entropy decoding unit 304. An inverse quantization process may include using a quantization parameter calculated by the video encoder 20 for each video block in the video slice, to determine a quantization degree that should be applied and, likewise, an inverse quantization degree that should be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (namely, a reconstructed residual block 313) to the prediction block 365 to obtain a reconstructed block 315 in a sample domain, for example, by adding a sample value of the reconstructed residual block 313 and a sample value of the prediction block 365.

The loop filter unit 320 (either during a coding loop or after a coding loop) is configured to filter the reconstructed block 315 to obtain a filtered block 321, to smooth pixel transition or improve video quality. In an example, the loop filter unit 320 may be configured to perform any combination of filtering technologies described below. The loop filter unit 320 is intended to represent one or more loop filters including, for example, a deblocking filter, an SAO filter, or another filter, for example, a bilateral filter, an ALF, a sharpening or smoothing filter, or a collaborative filter. Although the loop filter unit 320 is shown as an in-loop filter in FIG. 3, in other configurations, the loop filter unit 320 may be implemented as a post-loop filter.

A decoded video block in a given frame or picture is then stored in the decoded picture buffer 330 that stores a reference picture used for subsequent motion compensation. The decoded picture buffer 330 is further configured to store a library picture.

A bitstream parsing unit 303 is configured to parse, from a main bitstream according to a library-based encoding method, encoding information related to a referenced library picture, and when determining that a current to-be-processed picture and the referenced library picture are a same picture, skip performing a decoding operation on the to-be-processed picture, copy decoding information of the library picture, and output the decoding information through an output 332.

The decoder 30 is configured to, for example, output a decoded picture 331 through the output 332, for presentation to a user or viewing by a user.

Other variations of the video decoder 30 may be used to decode a compressed bitstream. For example, the decoder 30 may generate an output video stream without the loop filter unit 320. For example, a non-transform based decoder 30 may directly inverse-quantize a residual signal without the inverse transform processing unit 312 for some blocks or frames. In another implementation, the video decoder 30 may have the inverse quantization unit 310 and the inverse transform processing unit 312 combined into a single unit.

Further, in this embodiment of the present disclosure, the decoder 30 is configured to implement a coding method described in the following embodiments.

It should be understood that other structural variations of the video decoder 30 may be used to decode an encoded video bitstream. For example, the video decoder 30 may generate an output video stream without processing by the filter 320. Alternatively, for some picture blocks or picture frames, the entropy decoding unit 304 of the video decoder 30 does not obtain a quantized coefficient through decoding, and correspondingly, there is no need for the inverse quantization unit 310 and the inverse transform processing unit 312 to perform processing. The loop filter 320 is optional. In addition, in a case of lossless compression, the inverse quantization unit 310 and the inverse transform processing unit 312 are also optional. It should be understood that, in different application scenarios, the inter prediction unit and the intra prediction unit may be selectively enabled.

It should be understood that, in the encoder 20 and the decoder 30 in this application, a processing result of a step may be further processed and then output to a next step. For example, after a step such as interpolation filtering, motion vector derivation, or loop filtering, an operation such as clip or shift is further performed on a processing result of the corresponding step.

For example, a motion vector of a control point of the current picture block or a motion vector of a subblock of the current picture block derived from a motion vector of a neighboring affine coding block may be further processed. This is not limited in this application. For example, a value of the motion vector is constrained to be within a specific bit depth range. Assuming that an allowed bit depth of the motion vector is bitDepth, the value of the motion vector ranges from $-2^{(bitDepth-1)}$ to $2^{(bitDepth-1)}-1$, where the symbol "^" represents exponentiation. If bitDepth is 16, the value ranges from −32768 to 32767. If bitDepth is 18, the value ranges from −131072 to 131071. For another example, the value of the motion vector (for example, MVs of four 4×4 subblocks within one 8×8 picture block) is constrained so that a maximum difference between integer parts of the MVs of the four 4×4 subblocks does not exceed N pixels, for example, not exceed 1 pixel.

The following two manners may be used to constrain the value of the motion vector to be within the specific bit depth range:

Manner 1: Remove an overflow most significant bit of the motion vector:

$$ux=(vx+2^{bitDepth})\ \%2^{bitDepth},$$

$$vx=(ux>=2^{bitDepth-1})?(ux-2^{bitDepth}): ux,$$

$$uy=(vy+2^{bitDepth})\ \%2^{bitDepth}, \text{ and}$$

$$vy=(uy>=2^{bitDepth-1})?(uy-2^{bitDepth}): uy,$$

where vx represents a horizontal component of the motion vector of the picture block or the subblock of the picture block, vy represents a vertical component of the motion vector of the picture block or the subblock of the picture block, and ux and uy are intermediate values, and bitDepth represents a bit depth.

For example, a value of vx is −32769, and 32767 is derived according to the foregoing formulas. A value is stored in a computer in a two's complement representation, a two's complement representation of −32769 is 1,0111,1111,1111,1111 (17 bits), and processing performed by the computer for overflowing is discarding a most significant bit. Therefore, a value of vx is 0111,1111,1111,1111, that is, 32767. This value is consistent with the result derived through processing according to the formulas.

Manner 2: Clip the motion vector according to the following formulas:

$$Vx=\text{Clip3}(-2^{bitDepth-1}, 2^{bitDepth-1}-1, vx), \text{ and}$$

$$vy=\text{Clip3}(-2^{bitDepth-1}, 2^{bitDepth-1}-1, vy),$$

where vx represents a horizontal component of the motion vector of the picture block or the subblock of the picture block, and vy represents a vertical component of the motion vector of the picture block or the subblock of the picture block, x, y, and z are respectively corresponding to three input values of an MV clamping process Clip3, and Clip3 is defined to indicate clipping a value of z into a range [x, y]:

$$\text{Clip }3(x, y, z) = \begin{cases} x\ ; & z < x \\ y\ ; & z > y \\ z\ ; & \text{otherwise} \end{cases}.$$

Figure 4:
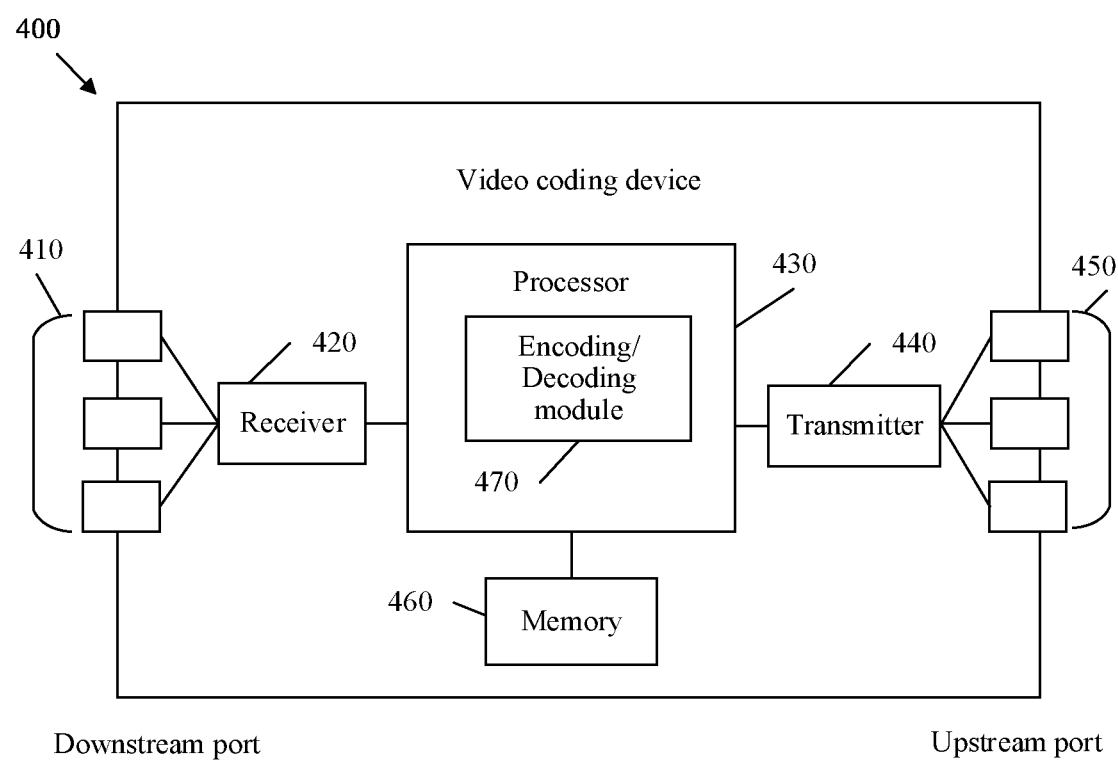
FIG. 4 is a block diagram of an example of a video coding device for implementing the embodiments of the present disclosure.

FIG. 4 is a schematic structural diagram of a video coding device 400 (for example, a video encoding device 400 or a video decoding device 400) according to an embodiment of the present disclosure. The video coding device 400 is suitable for implementing the embodiments described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or of the encoder 20 in FIG. 1A.

The video coding device 400 includes an ingress port 410 and a receiver unit (Rx) 420 for receiving data, a processor, a logic unit, or a central processing unit (CPU) 430 for processing data, a transmitter unit (Tx) 440 and an egress port 450 for transmitting data, and a memory 460 for storing data. The video coding device 400 may further include an optical-to-electrical (OE) conversion component and an electrical-to-optical (EO) component that are coupled to the ingress port 410, the receiver unit 420, the transmitter unit 440, and the egress port 450 for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiments disclosed in this specification, to implement a video coding method provided in the embodiments of the present disclosure. For example, the encoding/decoding module 470 implements, processes, or provides various coding operations. Therefore, the encoding/decoding module 470 substantially improves functions of the video coding device 400, and affects a transform of the video coding device 400 to a different state. Alternatively, the encoding/decoding module 470 is implemented as instructions stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or nonvolatile, and may be a ROM, a RAM, a ternary content-addressable memory (TCAM), and/or an SRAM.

Figure 5:
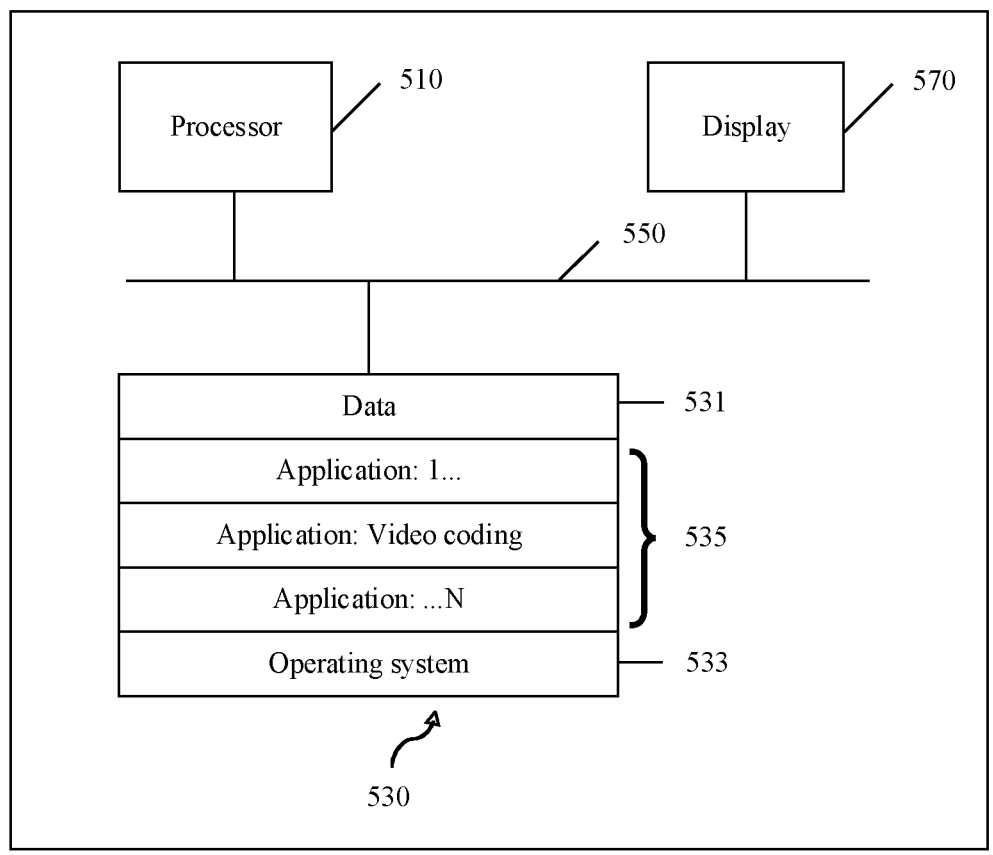
FIG. 5 is a block diagram of an example of another encoding apparatus or decoding apparatus for implementing the embodiments of the present disclosure.

FIG. 5 is simplified block diagram of an apparatus 500 that may be used as either or two of the source device 12 and the destination device 14 in FIG. 1A according to an example embodiment. The apparatus 500 may implement the technologies of this application. In other words, FIG. 5 is a schematic block diagram of an implementation of an encoding device or a decoding device (briefly referred to as a coding device 500) according to an embodiment of this application. The coding device 500 may include a processor 510, a memory 530, and a bus system 550. The processor and the memory are connected through the bus system. The memory is configured to store instructions. The processor is configured to execute the instructions stored in the memory. The memory of the coding device stores program code. The processor may invoke the program code stored in the memory to perform various video encoding or decoding methods described in this application, in particular, various new video coding methods. To avoid repetition, details are not described herein.

In this embodiment of this application, the processor 510 may be a CPU, or the processor 510 may be another general-purpose processor, a DSP, an ASIC, an FPGA or another programmable logic device, a discrete gate or transistor logic device, a discrete hardware component, or the like. The general-purpose processor may be a microprocessor, or the processor may be any conventional processor or the like.

The memory 530 may include a ROM device or a RAM device. Any other suitable type of storage device may alternatively be used as the memory 530. The memory 530 may include code and data 531 that are accessed by the processor 510 through the bus 550. The memory 530 may further include an operating system 533 and an application program 535. The application program 535 includes at least one program that allows the processor 510 to perform a video encoding or decoding method (in particular, a coding method described in this application) described in this application. For example, the application programs 535 may include applications 1 to N, and further include a video encoding or decoding application (briefly referred to as a video coding application) that is used to perform the video encoding or decoding method described in this application.

The bus system 550 may not only include a data bus, but also include a power bus, a control bus, a status signal bus, and the like. However, for clear description, various types of buses in the figure are marked as the bus system 550.

Optionally, the coding device 500 may further include one or more output devices, for example, a display 570. In an example, the display 570 may be a touch-sensitive display that combines a display and a touch-sensitive unit that is operable to sense a touch input. The display 570 may be connected to the processor 510 through the bus 550.

The following describes several technical concepts used in this application.

(1) Random Access Segment:

In video sequence processing, to enable an encoded video sequence to support a random access function, the video sequence is partitioned into a plurality of segments having a random access function (briefly referred to as random access segments). For example, one video sequence includes at least one random access segment, and each random access segment includes one random access picture and a plurality of non-random access pictures. A picture in a random access segment may be intra coded, or inter coded through inter prediction by referencing another picture in the video sequence.

(2) Library:

To mine and use information that is mutually referenced during encoding of pictures between a plurality of random access segments, a library picture (LP) is introduced into a library coding scheme. The library picture is a picture not in to a picture set that includes a random access segment to which a current picture belongs and a random access segment closest to and before the random access segment to which the current picture belongs in the random access segments and that needs to be displayed. The library picture is used as a reference picture to provide a reference for a to-be-encoded picture or a to-be-decoded picture. A database that stores a set of the library pictures may be referred to as a library. In addition, such a method for coding one picture in a video by referencing at least one library picture may be referred to as library-based video coding.

To eliminate redundant information between the random access segments, the library pictures are used to combine a plurality of random access segments that have related information within a long time span. In this way, the redundant information between the plurality of random access segments is removed. In a random access segment, a picture that provides a random access capability may also reference a library picture. For example, such a referenced library picture is referred to as a reference library (RL) picture in this specification. The RL picture provides a random access capability when the library picture is available.

(3) Reference Picture Set (Rps):

The reference picture set may include related information of a picture referenced by a current to-be-processed picture. The reference picture set may include information about a referenced non-library picture, and may further include information about a library picture. When the reference picture set includes the library picture, a library-based video coding method may be used for the current to-be-processed picture by referencing the library picture.

The reference picture set may also be referred to as a reference configuration set (rcs). The res may include a quantity of reference pictures, a number of a library picture corresponding to a reference picture included in the reference configuration set, and the like. For example, the res indicates whether an $i^{th}$ picture is a library picture, a number of the $i^{th}$ picture, and the like.

Figure 6A:
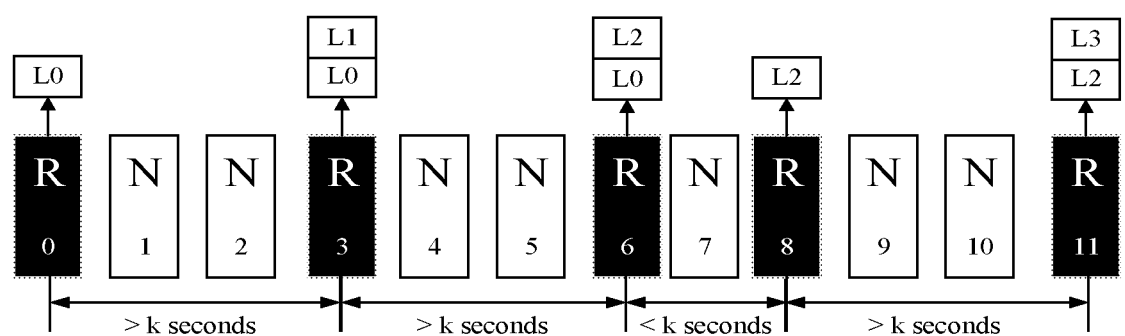
FIG. 6A shows an example of a possible structure of a bitstream according to an embodiment of the present disclosure.

(4) Library Bitstream:

When a video sequence is encoded by using library-based video coding, two bitstreams are generated. One is a bitstream that is obtained through encoding and that includes a library picture, and the bitstream that is obtained through encoding and that includes the library picture may be referred to as a library layer bitstream. The other is a bitstream that is obtained through encoding and that includes a library picture referenced by each frame of picture in the video sequence, and the bitstream that is obtained through encoding and that includes the library picture referenced by each frame of picture in the video sequence may be referred to as a main bitstream. In addition, a library picture may be repeatedly referenced by random access segments of a plurality of main bitstreams. For example, FIG. 6A shows a reference relationship between a random access segment that includes a main bitstream picture obtained by using a library-based video coding method and a library picture. Each library picture is referenced by at least two inconsecutive random access segments.

When the library-based video coding is performed, at least one picture is selected from a library corresponding to the current to-be-processed picture and used as a reference picture of the to-be-processed picture. The reference picture is intra encoded, to obtain encoded data of the reference picture. A reconstructed picture of the reference picture is obtained through reconstruction based on the encoded data of the reference picture. The to-be-processed picture is inter encoded based on the reconstructed picture of the reference picture, to obtain encoded data of the to-be-processed picture. Bitstream data of the reference picture is used as a library layer bitstream and sent to a decoder side, and bitstream data of the to-be-processed picture is used as a main bitstream and sent to the decoder side. After receiving the main bitstream of the current to-be-processed picture, the decoder side determines a picture in a reference library picture set as the reference picture, reconstructs a referenced library picture, and inter decodes the to-be-processed picture based on a reconstructed library picture to obtain a reconstructed pixel value of the to-be-processed picture. When a to-be-processed picture in the main bitstream is decoded, if the to-be-processed picture references a library picture in a library, the to-be-processed picture in the main bitstream can be decoded only after a library picture in the library layer bitstream is decoded. A library picture may be a picture in a to-be-processed video sequence. Certainly, obtained library pictures may alternatively be a picture obtained by modeling pictures in a to-be-processed video sequence and a picture obtained by synthesizing pictures in the to-be-processed video sequence. In other words, the library picture that is selected for and referenced by the current to-be-processed picture and the current to-be-processed picture may be a same picture. In this case, after encoding and decoding of the referenced library picture is complete, actually, there is no need to additionally encode and decode the to-be-processed picture in the main bitstream. Therefore, in the existing library-based video coding method, when the library picture that is selected for and referenced by the current to-be-processed picture and the current to-be-processed picture may be the same picture, redundancy is caused in the scheme in which the to-be-processed picture in the main bitstream is additionally encoded and decoded after encoding and decoding of the referenced library picture is complete.

Based on this, this application provides a video picture encoding method and apparatus, and a video picture decoding method and apparatus. When the library picture that is selected for and referenced by the current to-be-processed picture and the current to-be-processed picture may be the same picture, after encoding and decoding of the referenced library picture is complete, the to-be-processed picture in the main bitstream is no longer additionally encoded and decoded, instead, decoded data of the to-be-processed picture in the main bitstream is determined by simply copying decoded data of the referenced library picture. In this way, the existing coding scheme in which redundancy is caused can be avoided, and transmission resources can be saved. Because a problem-resolving principle of the method is similar to that of the apparatus, mutual reference may be made to implementations of the apparatus and the method, and no repeated description is provided.

In addition, it should be noted that, in this application, "at least one" means one or more, and "a plurality of" means two or more than two. The term "and/or" describes an association relationship between associated objects and represents that three relationships may exist. For example, A and/or B may represent the following cases: only A exists, both A and B exist, and only B exists, where A and B may be singular or plural. The character "/" usually indicates an "or" relationship between the associated objects. "At least one item (piece) of the following" or a similar expression thereof represent any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

The following describes in detail the solutions in the embodiments of this application.

To mine and use information that is mutually referenced during encoding of pictures between a plurality of random access segments, when encoding (or decoding) a picture, an encoder (or a decoder) may select, from a database, a picture whose texture content is similar to that of a current encoded picture (or a current decoded picture) as a reference picture. Such a reference picture is referred to as a library picture, and the database that stores a set of the reference picture is referred to as a library. Such a method for coding at least one picture in a video by referencing at least one library picture is referred to as library-based video coding. When a video sequence is encoded by using library-based video coding, a library layer bitstream, that is, a bitstream that is obtained through encoding and that includes a library picture and a video layer bitstream, that is, a bitstream that is obtained through encoding and that includes a library picture referenced by each frame of picture in the video sequence are generated. The two types of bitstreams are respectively similar to a basic layer bitstream and an enhanced layer bitstream that are generated by using scalable video coding (SVC). In other words, a sequence layer bitstream (the video layer bitstream) depends on the library layer bitstream. However, a dual-bitstream organization manner in library-based video coding and a scalable-bitstream organization manner in SVC have different dependency relationships between layer bitstreams. A difference lies in that layers of dual bitstreams in SVC depend on each other based on a specific alignment time period, whereas in library-based video coding, the video layer bitstream of dual bitstreams depends on the library layer bitstream based on a non-alignment time period.

Two bitstreams are obtained through encoding by using the library-based video coding method a library bitstream and a main video bitstream. Decoding of the main video bitstream needs to depend on the library bitstream. When a video frame in the main bitstream is decoded, if the frame references a frame in the library bitstream, the video frame in the main bitstream can be decoded only after the frame in the library bitstream is decoded. When frames in different library bitstreams are referenced when two neighboring frames in the main bitstream are arranged based on a decoding order, a decoding peak is generated and causes decoding impact on the decoder.

Example 1:

A syntax element for defining time is added to syntax, and value ranges of the syntax element are defined in different profiles and levels. In AVS3, syntax elements are shown in the following table.

| Sequence header definition | Descriptor |
|---|---|
| sequence_header( ){ | |
|     video_sequence_start_code | f(32) |
|     profile_id | u(8) |
|     level_id | u(8) |
|     library_picture_enable_flag | u(1) |
|     if(library_picture_enable_flag) | |
|         min_library_interval_time | u(12) |
| (The remaining syntax is omitted) | |
| } | |

Semantics of newly-added syntax elements are as follows:

The library_picture_enable_flag is a 1-bit flag. When a value is 1, it indicates that a current bitstream references an external library layer bitstream. When the value is 0, it indicates that the current bitstream does not reference the library layer bitstream. A quantity of bits of the field and values indicating different meanings may be flexibly defined and designed. This is not limited in the present disclosure.

The min_library_interval_time has 12 bits, and describes a minimum decoding time interval between library pictures referenced by the current bitstream. A value range of the minimum decoding time interval is limited in a profile and level. High six bits describe a value ranging from 0 to 59 in a unit of second. Low six bits describe a value ranging from 0 to 63. When a frame rate is less than 64, a unit of the value described by the low six bits is picture, when the frame rate is not less than 64, the unit of the value described by the low six bits is 1/64 second.

In a feasible embodiment, semantics of min_library_interval_time may be a symbol with a fixed bit length or a variable bit length, and describe the minimum decoding time interval between the library pictures referenced by the current bitstream. For example, bits of the syntax element respectively describe hour, minute, and second. For another example, the syntax element describes a value in a unit of second. For another example, the syntax element describes a value in a unit of picture. The value range of the minimum decoding time interval is limited in the profile and level. A lower limit of the value range of the minimum decoding time interval may be determined in different profiles and levels.

Further, in a possible implementation process, an encoder side may perform the following operations.

1. Initialize a library picture set L (library pictures in the set L are all available and have been reconstructed, and reconstructed pixels are obtained) that may be referenced during encoding of a main bitstream picture, where the set L includes all library pictures that can be used by an entire main bitstream, and initialize an encoding moment $t_j$ of a previous (last) main bitstream picture that references a new library picture to T (herein, the previous main bitstream picture is determined based on an encoding time sequence), where an initialization value of the encoding moment $t_j$ should ensure that the encoded first main bitstream picture (whose encoding moment is 0 seconds) can use any library picture as a candidate reference picture (for example, the initialization value is not greater than −k seconds, so that a difference between the encoding moment 0 of the first main bitstream picture and T is not less than k seconds), a value range of k and a value range of a quantity (fk+N) of pictures that can be decoded in k seconds (that is, a maximum of N more pictures than a quantity fk of pictures in the main bitstream are allowed to be decoded) may be limited in the profile and level, and a value of min_library_interval_time is determined based on the value of k.

For example, the value of min_library_interval_time is equal to the value of k.

For another example, the value of min_library_interval_time is equal to a value of k−1, to ensure that the value of min_library_interval_time starts from 0.

For another example, the value of the min_library_interval_time is equal to a value of log 2(k), to reduce a quantity of bits occupied by the min_library_interval_time, and add min_library_interval_time to a sequence header of the bitstream.

2. Encode an $i^{th}$ main bitstream picture:

(a) If the current encoded picture references a library picture (for example, whether the current picture references the library picture is determined by comparing encoding efficiency of encoding a picture by referencing a library picture with encoding efficiency of encoding the picture by referencing a short-term reference picture, in a specific implementation process, when the bitstream is allowed to reference a library picture (for example, library_picture_enable_flag is 1), any picture has a corresponding field to indicate whether the picture references a library picture, for example, the field may be a field of the picture, or may be a field that is allowed in the standard to inherited from another picture by default, and this step may be implemented by using an existing technical means, and therefore details are not described in the present disclosure), one of the following operations is performed:

(1) select m (m>0) library pictures from the library picture set L, where the m library pictures and a short-term reference picture of the $i^{th}$ main bitstream picture form a reference picture set, or (2) check whether a difference between an encoding moment $t_i$ of the currently encoded picture and T is greater than k ($t_i$ may be obtained through encoding timing, alternatively, a display time Ti of the current encoded picture and a difference ΔTi between the display time and the encoding time may be transmitted in the bitstream, so that a decoder side obtains $t_i$ based on the obtained Ti and ΔTi, where different encoded pictures may correspond to a same $t_i$ and ΔTi or may correspond to different $t_i$ and ΔTi, and this is not limited in the present disclosure, alternatively, $t_i$ may be obtained in another manner in the conventional technology, it should be understood that encoding information in the bitstream may be used to restrict an actual decoding moment).

In a case in which $t_i - t_j >= k$:

[1] select the m (m>0) library pictures from the library picture set L, and select n (0<n<N) library pictures that are not in the set L, where the m+n library pictures and the short-term reference picture of the $i^{th}$ main bitstream picture form a reference picture set, or

[2] select n (0<n<N) library pictures that are not in the set L, where the n library pictures and the short-term reference picture of the $i^{th}$ main bitstream picture form a reference picture set.

The operation method for selecting a library picture (the operation of selecting the m (m>0) library pictures from the library picture set L) includes but is not limited to:

(a1) selecting the m library pictures having highest content similarity based on content similarity between the $i^{th}$ main bitstream picture and the library pictures in the set L, (b1) when the library pictures in the set L are extracted from pictures presented in the video sequence (to be specific, content of a library picture is completely the same as content of a picture at a presentation moment in the video sequence), selecting the m library pictures having smallest differences (to be specific, temporally closer) based on differences between a presentation moment of the $i^{th}$ main bitstream picture and corresponding moments of the library pictures in the set L that are presented in the video, or (c1) selecting the m library pictures having highest encoding efficiency based on encoding efficiency of encoding the $i^{th}$ main bitstream picture by using the library pictures in the set L as reference pictures.

The operation method for selecting a library picture (the operation of selecting the n (0<n<N) library pictures from the library pictures that are not in the set L) includes but is not limited to:

(a2) selecting the n library pictures having highest content similarity based on content similarity between the $i^{th}$ main bitstream picture and the library pictures that are not in the set L, (b2) when the library pictures in the set L are extracted from pictures presented in the video sequence (to be specific, content of a library picture is completely the same as content of a picture at a presentation moment in the video sequence), selecting the n library pictures having smallest differences (to be specific, temporally closer) based on differences between a presentation moment of the $i^{th}$ main bitstream picture and corresponding moments of the library pictures that are not in the set L and that are presented in the video, or (c2) selecting the n library pictures having highest encoding efficiency based on encoding efficiency of encoding the $i^{th}$ main bitstream picture by using the library pictures that are not in the set L as reference pictures.

The library pictures in the set L have been reconstructed, and the library pictures that are not in the set L are not reconstructed or need to be reconstructed again. The library pictures that need to be reconstructed again satisfy one or more of the following conditions: a library picture that has been reconstructed is deleted or replaced due to an insufficient cache capacity, a library picture that has been reconstructed is damaged due to a cache content error, a library picture that has been reconstructed is deleted or replaced due to a management operation error, or a library picture that has been reconstructed is deleted or replaced due to expiration of a life cycle of the library picture, and the library picture needs to be referenced because of a replaying operation, a jump operation, or the like.

The short-term reference picture is a reconstructed picture of a main bitstream picture that is located before the $i^{th}$ main bitstream picture, that has been encoded, that is temporally close to the $i^{th}$ main bitstream picture, and that can be used as a candidate reference picture of the $i^{th}$ main bitstream picture (for example, a decoded main bitstream picture between a $0^{th}$ and an $(i-1)^{th}$ main bitstream pictures).

(b) If the current encoded picture does not reference a library picture, m=0, n=0, and a short-term reference picture of the current encoded picture forms a reference picture set.

3. Use the reference picture set as a candidate reference picture of an $i^{th}$ encoded picture, to encode the $i^{th}$ encoded picture. For example, when m+n>0, the m+n selected library pictures are used as a new library picture set L that may be referenced.

4. If the $i^{th}$ main bitstream picture is not the last picture in the sequence, return to step 2. If n is greater than 0, update a value of $t_j$ to $t_i$ for a next main bitstream picture (during implementation by using code, and i=i+1, in other words, process the next main bitstream picture). If the $i^{th}$ main bitstream picture is the last picture in the sequence, an encoding process ends.

In an example, it should be understood that a decoding moment of a decoded picture closest to a current decoded picture in at least one picture that is located before the current decoded picture (whose decoding moment is $t_i$) based on a decoding order and that references at least one new library picture (n is greater than 0) may be represented as $t_j$, where the new library picture is a library picture different from a library picture referenced by a decoded picture that is the second closest to the current decoded picture and that references a library picture. As a new library picture appears, $t_j$ is updated. Furthermore, the first value of $t_j$ is initialized to T, where T may be understood as an initial value of a decoding moment of a start picture in a picture sequence, and may be defined by a user based on a requirement. As decoding is continuously performed, $t_j$ is "replaced" depending on decoding of a decoded picture that references a new library picture. It should be understood that there is not only one replacement interval.

Further, in a possible implementation process, a decoder side may perform the following operations:

1. Receive the bitstream obtained through encoding by using a library-based video coding method.

2. Parse min_library_interval_time from the sequence header to obtain the minimum decoding time interval k seconds between the library pictures that is allowed in the bitstream. In this case, the bitstream satisfies the following condition, and the decoder needs to decode fk+N pictures (for example, N=1) in k seconds, where f represents the frame rate, and fk represents decoded pictures in the main bitstream.

For a main bitstream picture A that references a library picture and another main bitstream picture B that references a library picture, if there are a maximum of N different library pictures in library pictures that are referenced by A and B, a quantity of pictures between A and B is not less than a quantity of pictures in k seconds corresponding to the frame rate f that is of the video sequence and that is claimed in the bitstream. For example, a value of k is 1.

3. Based on profile and level information in the sequence header, obtain the lower limit of the minimum decoding time interval allowed in the profile and level that the current bitstream satisfies and the value range of the quantity (fk+N) of pictures that can be decoded in the current profile and level (that is, a maximum of N more pictures than the quantity fk of pictures in the main bitstream are allowed to be decoded).

When k is not less than the lower limit, the decoder determines that the current bitstream satisfies a coding standard supported by the decoder, and performs step 4.

When k is less than the lower limit, the decoder determines that the received bitstream is invalid, and terminates or suspends decoding.

4. Determine, based on a maximum quantity q of pictures that can be decoded by the decoder in k seconds, whether the decoder can decode and play the current bitstream in real time. When q is not less than fk+N, the decoder performs the following decoding operations. When q is less than fk+N, the decoder suspends decoding or terminates decoding.

(a) Initialize a decoding moment $t_j$ of a previous main bitstream picture that references a new library picture to T, where an initialization value of the decoding moment $t_j$ should ensure that the to-be-decoded first main bitstream picture (whose decoding moment is 0 seconds) can use any library picture as a candidate reference picture (for example, the initialization value is not greater than −k seconds, so that a difference between the decoding moment 0 of the first main bitstream picture and T is not less than k seconds).

(b) For the $i^{th}$ main bitstream picture:

i. If the picture references a library picture, perform one of the following operations:

[1] If a reference picture set/configuration set of the picture has m (m>0) library pictures that are from the library picture set L, and has no library picture that is not in the set L, skip decoding a new library picture, and use the m library pictures and the short-term reference picture of the $i^{th}$ main bitstream picture to form the reference picture set,

[2] If a reference picture set of the picture has m (m>0) library pictures that are from the library picture set L, and has n (0<n<N) library pictures that are not in the set L, check whether a difference between the decoding moment $t_i$ of the current decoded picture and T is greater than k, and when $t_i-t_j>=k$, decode the n library pictures, and use the m+n library pictures and the short-term reference picture of the $i^{th}$ main bitstream picture to form the reference picture set, or when $t_i-t_j<k$, determine that the received bitstream is invalid, and terminate or suspend decoding, or

[3] If a reference picture set of the picture has no library picture that is from the library picture set L, and has n (0<n<N) library pictures that are not in the set L, check whether a difference between the decoding moment $t_i$ of the current decoded picture and T is greater than k, and when $t_i-t_j>=k$, decode the n library pictures, and use the n library pictures and the short-term reference picture of the $i^{th}$ main bitstream picture to form the reference picture set, or when $t_i-t_j<k$, determine that the received bitstream is invalid, and terminate or suspend decoding.

All the library pictures in the set L are available and have been decoded, and the library pictures that are not in the set L are not decoded or need to be re-decoded.

A library picture that has been decoded is deleted or replaced due to an insufficient cache capacity.

Alternatively, a library picture that has been decoded is damaged due to a cache content error.

Alternatively, a library picture that has been decoded is deleted or replaced due to a management operation error.

Alternatively, a library picture that has been decoded is deleted or replaced due to expiration of a life cycle of the library picture, and the library picture needs to be referenced because of a replaying operation, a jump operation, or the like.

It should be understood that a decoding moment $t_i$ of any picture may be obtained based on information in the bitstream, or may be obtained by the decoder based on an actual situation. This is not limited and constrained in the present disclosure.

ii. If the picture does not reference a library picture (to be specific, m=0, and n=0), a short-term reference picture of the current encoded picture forms a reference picture set.

(c) Use the reference picture set as a candidate reference picture of the $i^{th}$ picture to decode the $i^{th}$ picture.

(d) If the main bitstream picture is not the last picture in the sequence, return to a previous step, and i=i+1, or if the $i^{th}$ main bitstream picture is the last picture in the sequence, a decoding process ends.

Example 2

In HEVC and VVC, syntax elements in vps are shown in the following table.

|  | Descriptor |
|---|---|
| video_parameter_set_rbsp( ){ |  |
|   vps_video_parameter_set_id | u(4) |
|   vps_base_layer_internal_flag | u(1) |
|   vps_base_layer_available_flag | u(1) |
|   vps_max_layers_minus1 | u(6) |
|   vps_max_sub_layers_minus1 | u(3) |
|   vps_temporal_id_nesting_flag | u(1) |
|   vps_reserved_0xffff_16bits | u(16) |
|   profile_tier_level(1, vps_max_sub_layers_minus1) |  |
|   vps_library_picture_enable_flag | u(1) |
|   if(vps_library_picture_enable_flag) |  |
|     min_library_interval_time | u(12) |
|   (The remaining syntax is omitted) |  |
| } |  |

Semantics of newly-added syntax elements are as follows:

The vps_library_jicture_enable_flag is a 1-bit flag. When a value is 1, it indicates that a current bitstream references an external library layer bitstream. When the value is 0, it indicates that the current bitstream does not reference the library layer bitstream. A quantity of bits of the field and values indicating different meanings may be flexibly defined and designed. This is not limited in the present disclosure.

The min_library_interval_time has 12 bits, and describes a minimum decoding time interval between library pictures referenced by the current bitstream. A value range of the minimum decoding time interval is limited in a profile and level. High six bits describe a value ranging from 0 to 59 in a unit of second. Low six bits describe a value ranging from 0 to 63. When a frame rate is less than 64, a unit is picture, or when the frame rate is not less than 64, the unit is 1/64 second.

In a feasible embodiment, semantics of min_library_interval_time may be a symbol with a fixed bit length or a variable bit length, and describe the minimum decoding time interval between the library pictures referenced by the current bitstream. For example, bits of the syntax element respectively describe hour, minute, and second. For another example, the syntax element describes a value in a unit of second. For another example, the syntax element describes a value in a unit of picture. The value range of the minimum decoding time interval is limited in the profile and level. A lower limit of the value range of the minimum decoding time interval may be determined in different profiles and levels.

Further, in a possible implementation process, the encoder side may perform the operations of the encoder in Example 1, and the decoder side may perform the operations of the decoder in Example 1.

Example 3:

In HEVC and VVC, syntax elements in sps are shown in the following table.

|  | Descriptor |
|---|---|
| seq_parameter_set_rbsp( ){ |  |
|   sps_video_parameter_set_id | u(4) |
|   sps_max_sub_layers_minus1 | u(3) |
|   sps_temporal_id_nesting_flag | u(1) |
|   profile_tier_level(1, sps_max_sub_layers_minus1) |  |
|   sps_library_picture_enable_flag | u(1) |
|   if(sps_library_picture_enable_flag) |  |
|     min_library_interval_time | u(12) |
|   (The remaining syntax is omitted) |  |
| } |  |

Semantics of newly-added syntax elements are as follows:

The sps_library_picture_enable_flag is a 1-bit flag. When a value is 1, it indicates that a current bitstream references an external library layer bitstream. When the value is 0, it indicates that the current bitstream does not reference the library layer bitstream. A quantity of bits of the field and values indicating different meanings may be flexibly defined and designed. This is not limited in the present disclosure.

The min_library_interval_time has 12 bits, and describes a minimum decoding time interval between library pictures referenced by the current bitstream. A value range of the minimum decoding time interval is limited in a profile and level. High six bits describe a value ranging from 0 to 59 in a unit of second. Low six bits describe a value ranging from 0 to 63. When a frame rate is less than 64, a unit is picture, or when the frame rate is not less than 64, the unit is 1/64 second.

In a feasible embodiment, semantics of min_library_interval_time may be a symbol with a fixed bit length or a variable bit length, and describe the minimum decoding time interval between the library pictures referenced by the current bitstream. For example, bits of the syntax element respectively describe hour, minute, and second. For another example, the syntax element describes a value in a unit of second. For another example, the syntax element describes a value in a unit of picture. The value range of the minimum decoding time interval is limited in the profile and level. A lower limit of the value range of the minimum decoding time interval may be determined in different profiles and levels.

Further, in a possible implementation process, the encoder side may perform the operations of the encoder in Example 1, and the decoder side may perform the operations of the decoder in Example 1.

Furthermore, a possible design in the present disclosure includes the following implementations.

Embodiment 1

A minimum time interval between library pictures referenced by a main video bitstream picture is limited.

Solution 1: For a main bitstream picture A that references a library picture and another main bitstream picture B that references a library picture, if the library pictures referenced by A and B are different (there is one or more different library pictures), a quantity of pictures between A and B is not less than a quantity of pictures in k seconds corresponding to a frame rate that is of a video sequence and that is claimed in a bitstream. For example, a value of k is 1.

An encoder performs the following operations:

S1: Initialize an encoding moment T of a previous main bitstream picture that references a library picture, where an initialization value of the encoding moment T is not greater than −k, and initialize a library picture set L that may be referenced during encoding of a main bitstream picture to infinite.

S2: When an $i^{th}$ main bitstream picture is encoded, check whether a difference between an encoding moment $t_i$ of the current encoded picture and T is greater than k, and when $t_i-T>=k$, select m (m>=0) library pictures from the library picture set L, and select n (n>=0) library pictures that are not in the set L, where the m+n library pictures and a short-term reference picture of the $i^{th}$ main bitstream picture form a reference picture set, or when $t_i-T<k$, select m (m>=0) library pictures from the library picture set L, where the m library pictures and a short-term reference picture of the $i^{th}$ main bitstream picture form a reference picture set.

S3: Encode the $i^{th}$ encoded picture by using the reference picture set, when n>0, use the n selected library pictures as a new library picture set L that may be referenced, and update a value of T to $t_i$, and when n=0, keep T unchanged.

S4: If the $i^{th}$ main bitstream picture is not the last picture in the sequence, return to step 2, and i=i+1, or if the $i^{th}$ main bitstream picture is the last picture in the sequence, an encoding process ends.

A structure of a bitstream generated by the encoder is shown in FIG. 6A.

In the foregoing example bitstream, L* represents a library picture, R* represents an encoded picture that references a library picture, and N* represents an encoded picture that does not reference a library picture. The encoder generating the foregoing example bitstream performs the following example operations (for ease of description, short-term reference pictures referenced by an R picture and an N picture are not described in detail):

It is assumed that k=3 and n<=1.

Initialize T to T=−k, and initialize a library picture set L to infinite, that is, L=∞.

Because 0−T>=k, for R0, select L0 from the library picture set L as a reference picture, and perform encoding, update T to T=0, and update the library picture set L to L={L0}.

N1 and N2 do not reference a library picture.

Because 3−T>=k, for R3, select L0 (all pictures in the set L) from the library picture set L as a reference picture, and select L1 that does not belong to the library picture set L as a reference picture, and perform encoding, update T to T=3, and update the library picture set L to L={L0, L1}.

N4 and N5 do not reference a library picture.

Because 6−T>=k, for R6, select L0 (a picture in a subset of the set L) from the library picture set L as a reference picture, and select L2 that does not belong to the library picture set L as a reference picture, and perform encoding, update T to T=6, and update the library picture set L to L={L0, L2}.

N7 does not reference a library picture.

Because 8−T<k, for R8, select L2 from the library picture set L as a reference picture (a library picture that does not belong to the library picture set L cannot be selected as a reference picture), and perform encoding, update T to T=8, and update the library picture set L to L={L2}.

N9 and N10 do not reference a library picture.

Because 11−T>=k, for R11, select L2 (all pictures in the set L) from the library picture set L as a reference picture, and select L3 that does not belong to the library picture set L as a reference picture, and perform encoding, update T to T=11, and update the library picture set L to L={L2, L3}.

Encoding ends.

A decoder performs the following operations:

Receive the bitstream obtained through encoding by using a library-based video coding method, where if the bitstream satisfies the following condition, the decoder needs to decode fk+n pictures in k seconds.

(a) For a main bitstream picture A that references a library picture and another main bitstream picture B that references a library picture, if there are n different library pictures in library pictures referenced by A and B, a quantity of pictures between A and B is not less than the quantity of pictures in k seconds corresponding to the frame rate f that is of the video sequence and that is claimed in the bitstream. For example, a value of k is 1.

For the $i^{th}$ main bitstream picture:

(a) If the picture references a library picture, decode a library picture that is newly added relative to a library picture referenced by a previous main bitstream picture, where there is a maximum of n newly-added library pictures, and use the foregoing library picture as a reference picture to decode the main bitstream picture.

(b) If the picture does not reference a library picture, decode the main bitstream picture.

If the $i^{th}$ main bitstream picture is not the last picture in the sequence, return to a previous step, and i=i+1, or if the $i^{th}$ main bitstream picture is the last picture in the sequence, a decoding process ends.

Figure 6B:
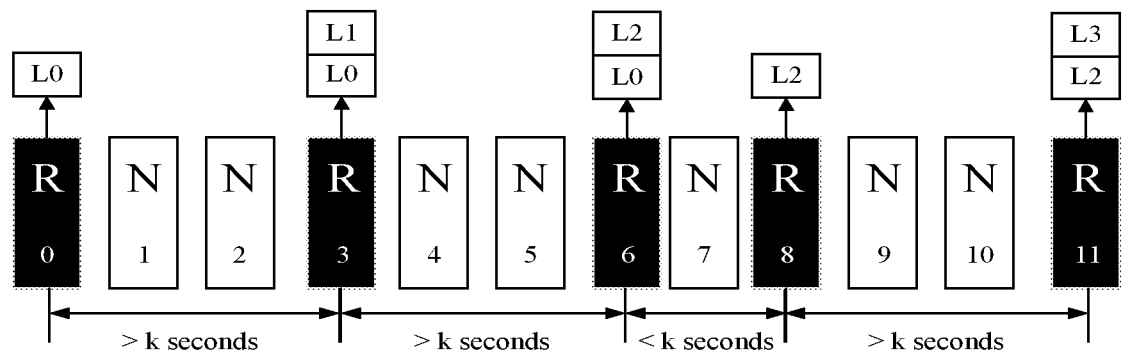
FIG. 6B shows an example of a possible structure of a bitstream in the embodiments of the present disclosure.

For example, when the decoder (limited to decoding a maximum of one library picture in k seconds) receives a bitstream shown in FIG. 6B, the decoder can implement real-time decoding.

Figure 6C:
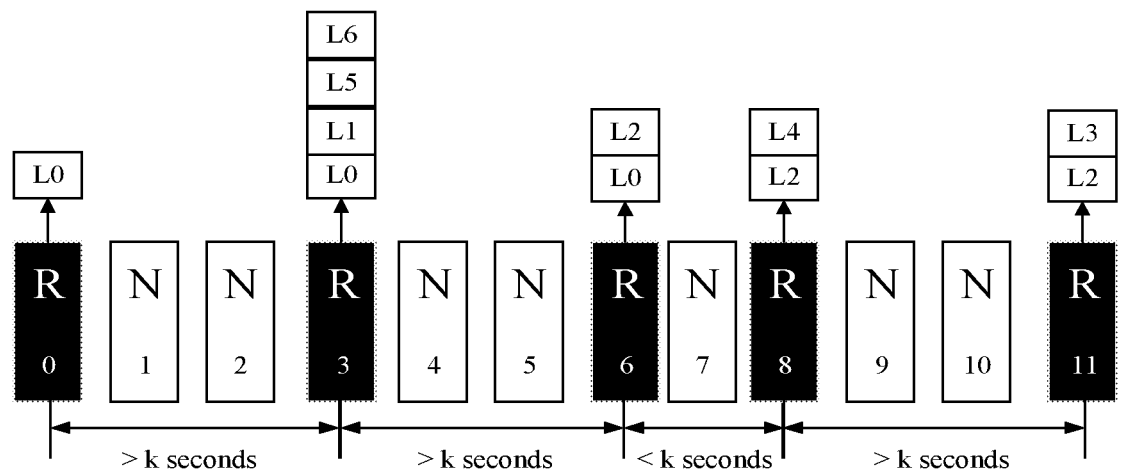
FIG. 6C shows an example of a possible structure of a bitstream in the embodiments of the present disclosure.

For example, when the decoder (limited to decoding a maximum of one library picture in k seconds) receives a bitstream shown in FIG. 6C, the decoder cannot implement real-time decoding of R3 and R8 because R3 references three more library pictures than R0 although a time interval between R3 and R0 is greater than k seconds, and because a time interval between R8 and R6 is less than k seconds although there is only one different library picture in library pictures referenced by R8 and R6.

Embodiment 2

For an encoded picture A that references a library picture, an encoded picture that references a library picture and that is decoded before A is decoded is denoted as B, and A should satisfy all the following conditions.

All encoded pictures that are located between A and B in a bitstream do not reference a library picture.

There are a maximum of n library pictures that are in library pictures referenced by A but that are not referenced by B.

When there are n library pictures that are referenced by A but not referenced by B, a quantity of pictures decoded between A and B is at least a quantity of pictures in k seconds corresponding to a frame rate that is of a video sequence and that is claimed in the bitstream. Impact of a k-second limitation is that there is a capability of decoding n more pictures every k seconds.

An encoder performs the following operations:

S1: Initialize an encoding moment T of a previous main bitstream picture that references a library picture, where an initialization value of the encoding moment T is not greater than −k, and initialize a library picture set L that may be referenced during encoding of a main bitstream picture to infinite.

S2: When an $i^{th}$ main bitstream picture is encoded, check whether a difference between an encoding moment $t_i$ of the current encoded picture and T is greater than k, and (a) when $t_i$−T>=k, select m (m>=0) library pictures from the library picture set L, and select n (n>=0) library pictures that are not in the set L, where the m+n library pictures and a short-term reference picture of the $i^{th}$ main bitstream picture form a reference picture set, or (b) when $t_i$−T<k, select only a short-term reference picture of the $i^{th}$ main bitstream picture to form a reference picture set.

S3: Encode the $i^{th}$ encoded picture by using the reference picture set, and when m+n>0, use the m+n selected library pictures as a new library picture set L that may be referenced, and update a value of T to $t_i$.

S4: If the $i^{th}$ main bitstream picture is not the last picture in the sequence, return to step 2, and i=i+1, or if the $i^{th}$ main bitstream picture is the last picture in the sequence, an encoding process ends.

Figure 7A:
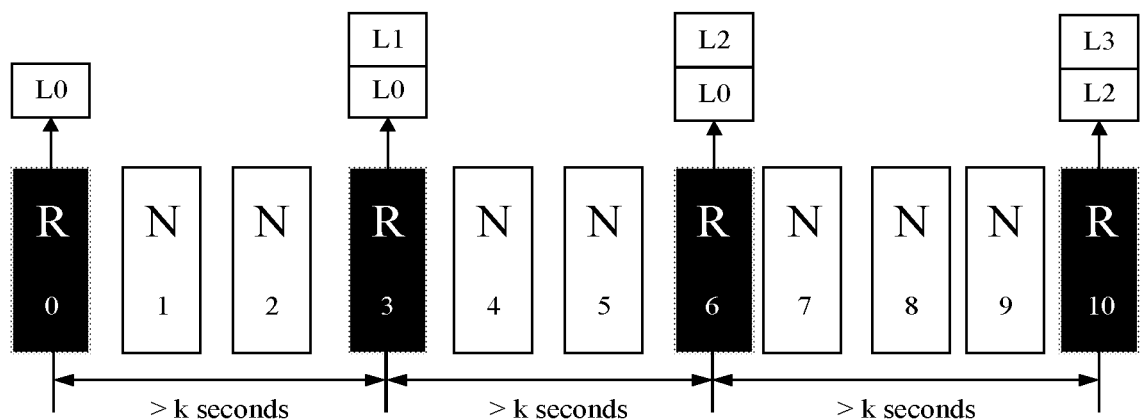
FIG. 7A shows an example of a possible structure of a bitstream in the embodiments of the present disclosure.

A structure of a bitstream generated by the encoder may be shown in FIG. 7A. In the example bitstream, L* represents a library picture, R* represents an encoded picture that references a library picture, and N* represents an encoded picture that does not reference a library picture.

A decoder performs the following operations.

Receive the bitstream obtained through encoding by using a library-based video coding method, where if the bitstream satisfies the following condition, the decoder needs to decode fk+n pictures in k seconds.

(a) For a main bitstream picture A that references a library picture and another main bitstream picture B that references a library picture, a picture between A and B does not reference a library picture. If there are n different library pictures in library pictures referenced by A and B, a quantity of pictures between A and B is not less than the quantity of pictures in k seconds corresponding to the frame rate f that is of the video sequence and that is claimed in the bitstream. For example, a value of k is 1.

For the $i^{th}$ main bitstream picture:

(a) If the picture references a library picture, decode a library picture that is newly added relative to a library picture referenced by a previous main bitstream picture, where there is a maximum of n newly-added library pictures, and use the foregoing library picture as a reference picture to decode the main bitstream picture.

(b) If the picture does not reference a library picture, decode the main bitstream picture.

If the $i^{th}$ main bitstream picture is not the last picture in the sequence, return to a previous step, and i=i+1, or if the $i^{th}$ main bitstream picture is the last picture in the sequence, a decoding process ends.

Figure 7B:
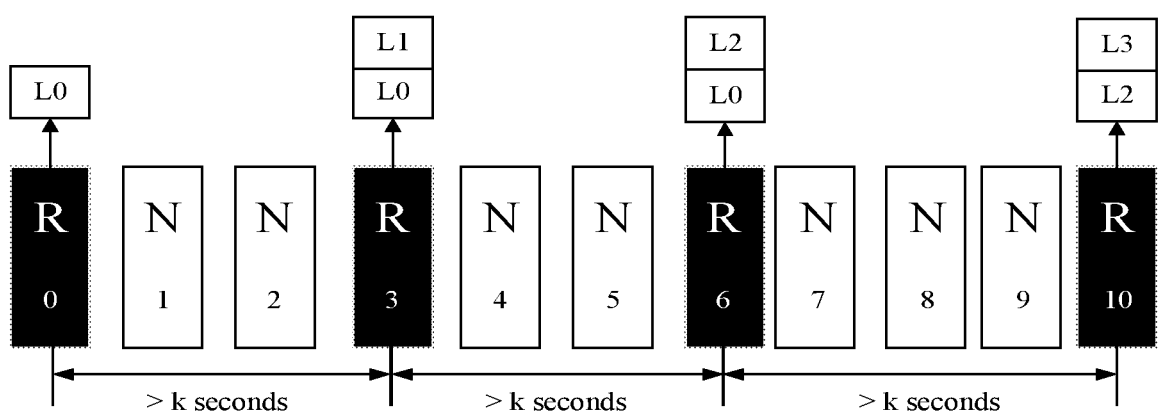
FIG. 7B shows an example of a possible structure of a bitstream in the embodiments of the present disclosure.

For example, when the decoder (limited to decoding a maximum of one library picture in k seconds) receives a bitstream shown in FIG. 7B, the decoder can implement real-time decoding.

Figure 7C:
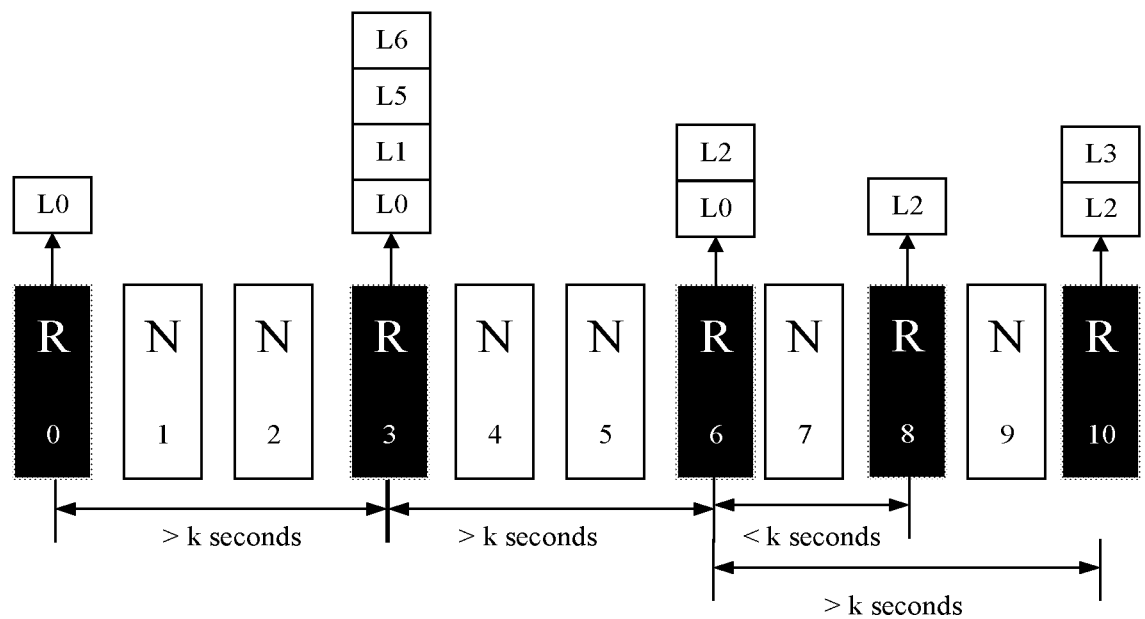
FIG. 7C shows an example of a possible structure of a bitstream in the embodiments of the present disclosure.

For example, when the decoder (limited to decoding a maximum of one library picture in k seconds) receives a bitstream shown in FIG. 7C, the decoder cannot implement real-time decoding of R3 and R8 because R3 references three more library pictures than R0 although a time interval between R3 and R0 is greater than k seconds, and because a time interval between R8 and R6 is less than k seconds although a library picture referenced by R8 is a subset of a library picture referenced by R6 (in other words, decoding of a new library picture does not occur).

Embodiment 3

For an encoded picture A that references a library picture, an encoded picture that references a library picture and that is decoded before A is decoded is denoted as B, and A should satisfy all the following conditions.

If an encoded picture that is located between A and B in a bitstream references a library picture, the library picture referenced by the encoded picture should be a library picture referenced by B or a subset of the library picture referenced by B.

There is a maximum of one library picture that is in a library picture referenced by A but that is not referenced by B.

A quantity of pictures decoded between A and B is at least a quantity of pictures in k seconds corresponding to a frame rate that is of a video sequence and that is claimed in the bitstream. Impact of a k-second limitation is that there is a capability of decoding one more picture every k seconds.

An encoder performs the following operations:

1. Initialize an encoding moment T of a previous main bitstream picture that references a library picture, where an initialization value of the encoding moment T is not greater than −k, and initialize a library picture set L that may be referenced during encoding of a main bitstream picture to infinite.

2. When an $i^{th}$ main bitstream picture is encoded, check whether a difference between an encoding moment $t_i$ of the current encoded picture and T is greater than k, and (a) when $t_i$−T>=k, select m (m>=0) library pictures from the library picture set L, and select n (n>=0) library pictures that are not in the set L, where the m+n library pictures and a short-term reference picture of the $i^{th}$ main bitstream picture form a reference picture set, and when m+n>0, use the m+n selected library pictures as a new library picture set L that may be referenced, and update a value of T to $t_i$, or (b) when $t_i$−T<k, select m (m>=0) library pictures from the library picture set L, where the m library pictures and a short-term reference picture of the $i^{th}$ main bitstream picture form a reference picture set.

3. Encode the $i^{th}$ encoded picture by using the reference picture set.

4. If the $i^{th}$ main bitstream picture is not the last picture in the sequence, return to step 2, and i=i+1, or if the $i^{th}$ main bitstream picture is the last picture in the sequence, an encoding process ends.

Figure 8A:
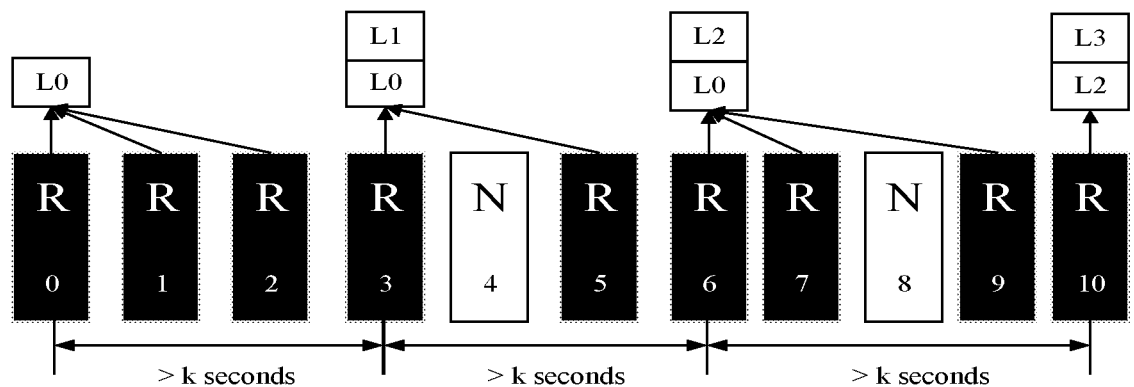
FIG. 8A shows an example of a possible structure of a bitstream in the embodiments of the present disclosure.

A structure of a bitstream generated by the encoder may be shown in FIG. 8A. In the example bitstream, L* represents a library picture, R* represents an encoded picture that references a library picture, and N* represents an encoded picture that does not reference a library picture.

A decoder performs the following operations:

Receive the bitstream obtained through encoding by using a library-based video coding method, where if the bitstream satisfies the following condition, the decoder needs to decode fk+n pictures in k seconds.

(a) For a main bitstream picture A that references a library picture and another main bitstream picture B that references a library picture, a picture between A and B references only the library picture referenced by A or a subset of the library picture referenced by A. If there are n different library pictures in library pictures referenced by A and B, a quantity of pictures between A and B is not less than a quantity of pictures in k seconds corresponding to the frame rate f that is of the video sequence and that is claimed in the bitstream. For example, a value of k is 1.

For the $i^{th}$ main bitstream picture:

(a) If the picture references a library picture, decode a library picture that is newly added relative to a library picture referenced by a previous main bitstream picture, where there is a maximum of n newly-added library pictures, and use the foregoing library picture as a reference picture to decode the main bitstream picture.

(b) If the picture does not reference a library picture, decode the main bitstream picture.

If the $i^{th}$ main bitstream picture is not the last picture in the sequence, return to a previous step, and i=i+1, or if the $i^{th}$ main bitstream picture is the last picture in the sequence, a decoding process ends.

Figure 8B:
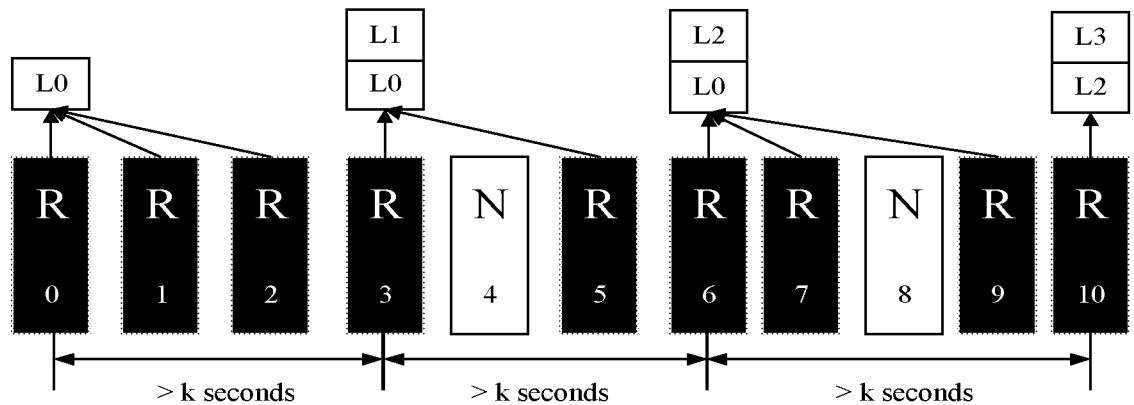
FIG. 8B shows an example of a possible structure of a bitstream in the embodiments of the present disclosure.

For example, when the decoder (limited to decoding a maximum of one library picture in k seconds) receives a bitstream shown in FIG. 8B, the decoder can implement real-time decoding.

Figure 8C:
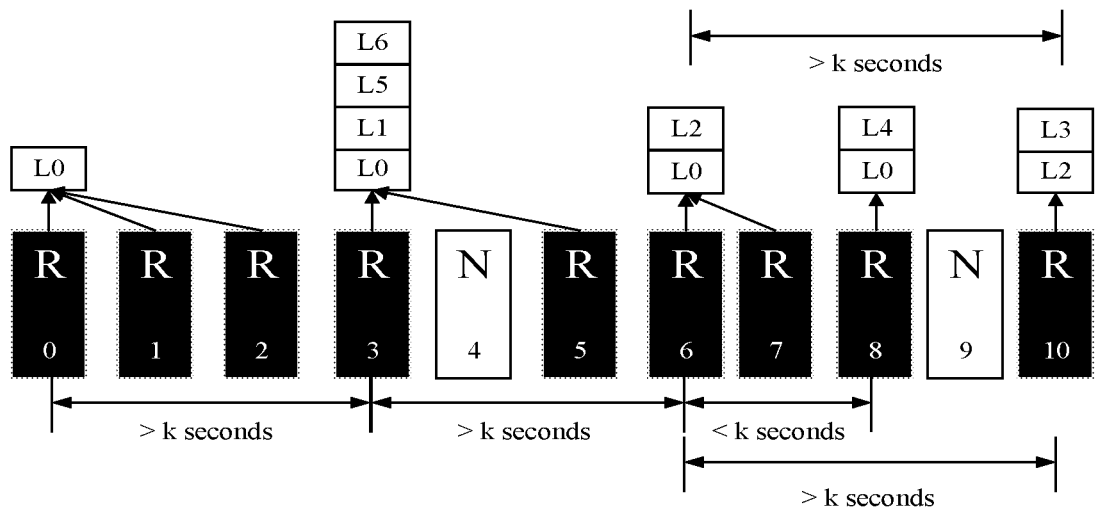
FIG. 8C shows an example of a possible structure of a bitstream in the embodiments of the present disclosure.

For example, when the decoder (limited to decoding a maximum of one library picture in k seconds) receives a bitstream shown in FIG. 8C, the decoder cannot implement real-time decoding of R3 and R8 because R3 references three more library pictures than R0 although a time interval between R3 and R0 is greater than k seconds, and because a time interval between R8 and R6 is less than k seconds although there is only one different library picture in library pictures referenced by R8 and R6.

Embodiment 4

For an RL picture A that immediately follows a sequence header, that supports random access, and that references only a library picture, an RL picture closest to A in at least one RL picture that is in a bitstream, that immediately follows a sequence header, and that is located before A is denoted as B, and A should satisfy all the following conditions.

There is a maximum of one library picture that is in a library picture referenced by A but that is not referenced by B.

A quantity of pictures decoded between A and B is at least a quantity of pictures in k seconds corresponding to a frame rate that is of a video sequence and that is claimed in the bitstream. Impact of a k-second limitation is that there is a capability of decoding one more picture every k seconds.

An encoder performs the following operations:

1. Initialize an encoding moment T of a previous main bitstream picture that references a library picture, where an initialization value of the encoding moment T is not greater than −k, and initialize a library picture set L that may be referenced during encoding of a main bitstream picture to infinite.

2. When an $i^{th}$ main bitstream picture is encoded:

(a) If the current picture is an RL picture, check whether a difference between an encoding moment $t_i$ of the current encoded picture and T is greater than k, and (1) when $t_i$−T>=k, select m (m>=0) library pictures from the library picture set L, and select n (n>=0) library pictures that are not in the set L, where the m+n library pictures form a reference picture set, and when m+n>0, use the m+n selected library pictures as a new library picture set L that may be referenced, and update a value of T to $t_i$, or (2) when $t_i$−T<k, select m (m>=0) library pictures from the library picture set L, where the m library pictures form a reference picture set.

(b) If the current picture is not an RL picture, select m (m>=0) library pictures from the library picture set L, where the m library pictures form a reference picture set.

3. Encode the $i^{th}$ encoded picture by using the reference picture set.

4. If the $i^{th}$ main bitstream picture is not the last picture in the sequence, return to step 2, and i=i+1, or if the $i^{th}$ main bitstream picture is the last picture in the sequence, an encoding process ends.

Figure 9A:
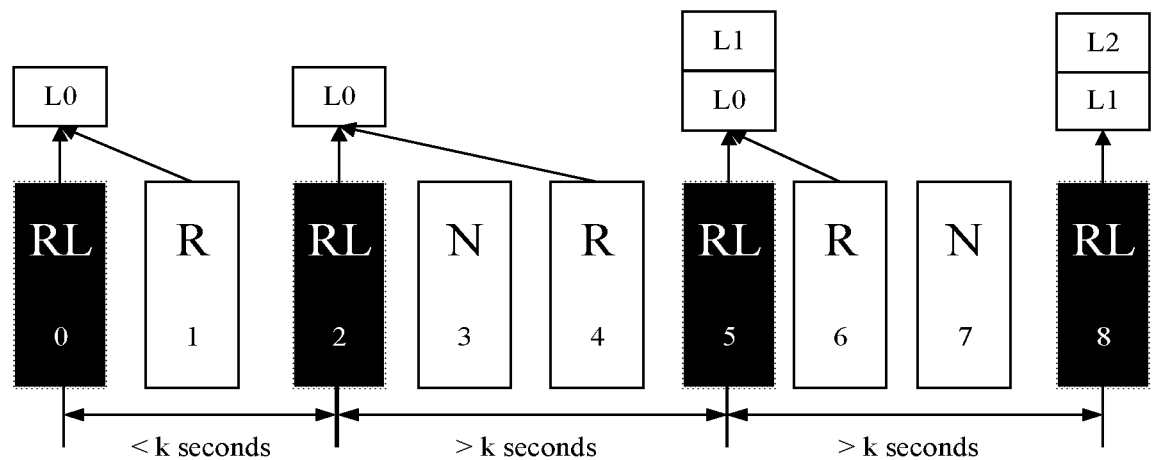
FIG. 9A shows an example of a possible structure of a bitstream in the embodiments of the present disclosure.

A structure of a bitstream generated by the encoder may be shown in FIG. 9A. In the example bitstream, L* represents a library picture, R* represents an encoded picture that references a library picture, RL* represents an encoded picture that references only a library picture, and N* represents an encoded picture that does not reference a library picture.

A decoder performs the following operations:

S1: Receive the bitstream obtained through encoding by using a library-based video coding method, where if the bitstream satisfies the following condition, the decoder needs to decode fk+n pictures in k seconds.

(a) For an RL picture A that immediately follows a sequence header, that supports random access, and that references only a library picture, an RL picture closest to A in at least one RL picture that is in a bitstream, that immediately follows a sequence header, and that is located before A is denoted as B. There is a maximum of n library pictures that are in library pictures referenced by A but that are not referenced by B, and a quantity of pictures decoded between A and B is at least a quantity of pictures in k seconds corresponding to the frame rate f that is of the video sequence and that is claimed in the bitstream. Impact of a k-second limitation is that there is a capability of decoding one more picture every k seconds.

S2: For the $i^{th}$ main bitstream picture:

(a) If the picture references a library picture, decode a library picture that is newly added relative to a library picture referenced by a previous main bitstream picture, where there is a maximum of n newly-added library pictures, and use the foregoing library picture as a reference picture to decode the main bitstream picture.

(b) If the picture does not reference a library picture, decode the main bitstream picture.

S3: If the $i^{th}$ main bitstream picture is not the last picture in the sequence, return to a previous step, and i=i+1, or if the $i^{th}$ main bitstream picture is the last picture in the sequence, a decoding process ends.

Figure 9B:
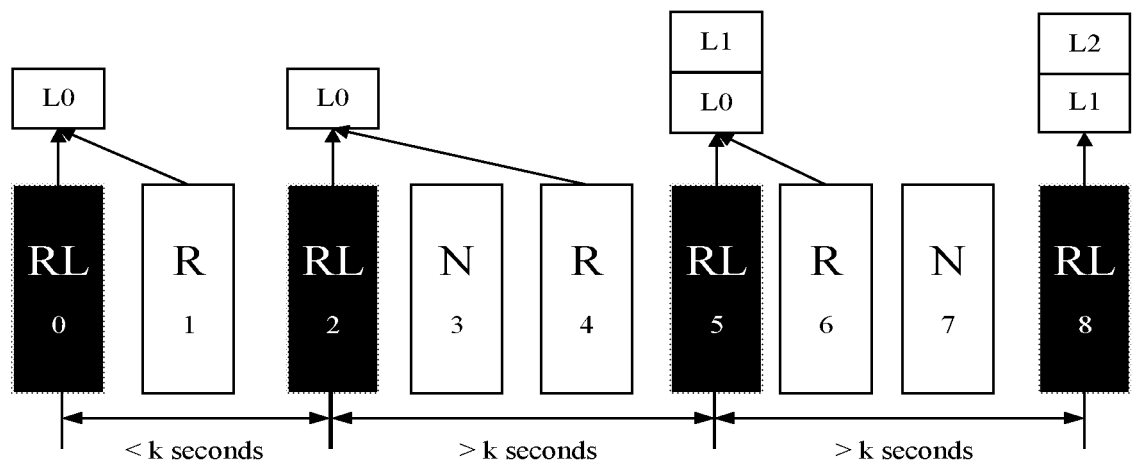
FIG. 9B shows an example of a possible structure of a bitstream in the embodiments of the present disclosure.

For example, when the decoder (limited to decoding a maximum of one library picture in k seconds) receives a bitstream shown in FIG. 9B, the decoder can implement real-time decoding.

Figure 9C:
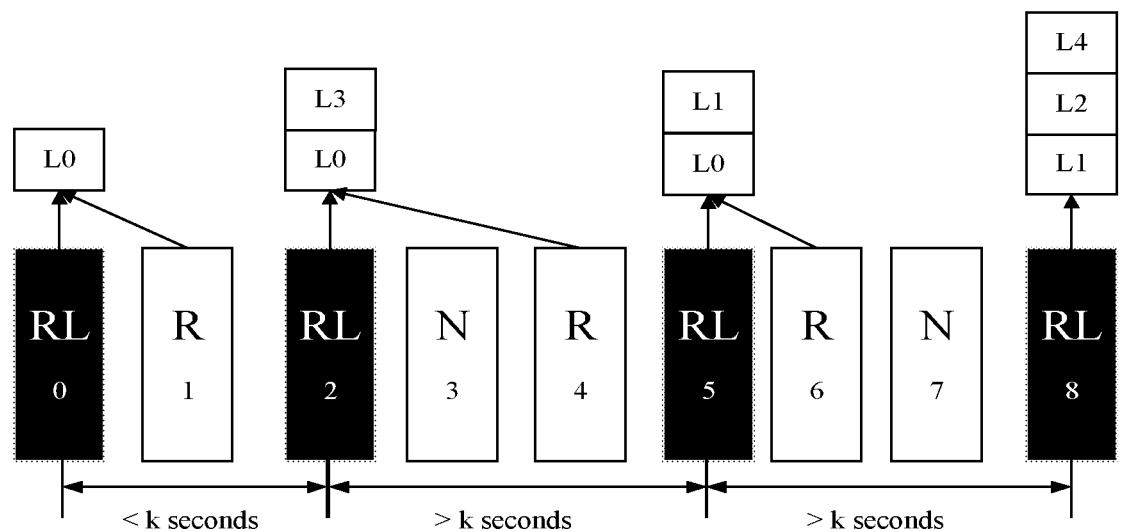
FIG. 9C shows an example of a possible structure of a bitstream in the embodiments of the present disclosure.

For example, when the decoder (limited to decoding a maximum of one library picture in k seconds) receives a bitstream shown in FIG. 9C, the decoder cannot implement real-time decoding of RL2 and RL8 because a time interval between RL2 and RL0 is less than k seconds although there is only one different library picture in library pictures referenced by RL2 and RL0, and because RL8 references two more library pictures than RL0 although a time interval between RL8 and RL5 is greater than k seconds.

Figure 9D:
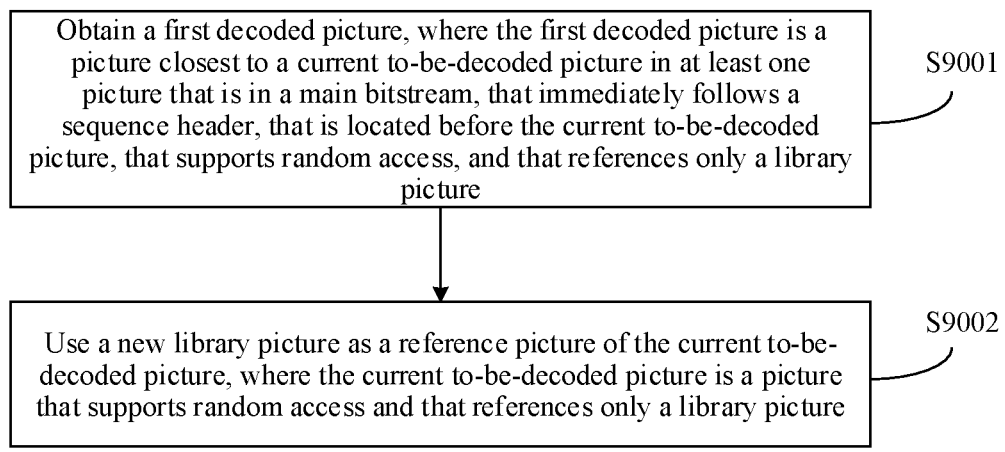
FIG. 9D is a schematic flowchart of a decoding method in the embodiments of the present disclosure.

With reference to the foregoing embodiments, as shown in FIG. 9D, this application discloses an optional decoding method 9000. The decoding method 9000 includes the following steps.

S9001: Obtain a first decoded picture, where the first decoded picture is a picture closest to a current to-be-decoded picture in at least one picture that is in a main bitstream, that immediately follows a sequence header, that is located before the current to-be-decoded picture, that supports random access, and that references only a library picture.

The first decoded picture may be understood as but not limited to the picture B in the foregoing embodiments, and the current to-be-decoded picture may be understood as but not limited to the picture A in the foregoing embodiments.

S9002: Use a new library picture as a reference picture of the current to-be-decoded picture, where the current to-be-decoded picture is a picture that supports random access and that references only a library picture.

A quantity of pictures decoded between the current to-be-decoded picture and the first decoded picture in the main bitstream is at least f*k, for example, but is not limited to f*k+n, where k is a minimum decoding time interval between library pictures that is allowed in the main bitstream, and f is a frame rate that is of a video sequence and that is claimed in the main bitstream. A quantity of new library pictures is not greater than a preset value n, where n is a positive integer. The new library picture is a library picture that is referenced by the current to-be-decoded picture (for example, the picture A) but not referenced by the first decoded picture (for example, the picture B). The new library picture is obtained by decoding a library bitstream. Optionally, a value of n may include but is not limited to 1 and 2. The new library picture may be obtained by decoding the library bitstream.

Further, the method 9000 may further include the following step.

S9003: Decode the current to-be-decoded picture based on the new library picture.

Figure 12:
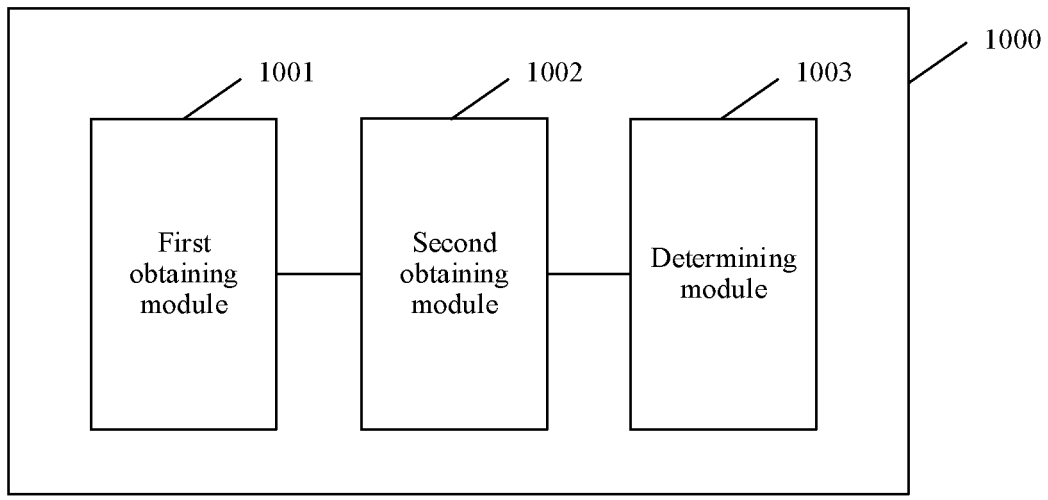
FIG. 12 is a structural block diagram of a device for implementing the embodiments of the present disclosure.

Correspondingly, the foregoing method 9000 may be executed on or applied to a device 1000 (as shown in FIG. 12). Further, a second obtaining module 1002 may perform S9001, and a determining module 1003 may perform S9002.

In a specific implementation process, the device 1000 may further include a decoding module 1004 (not shown in FIG. 12). The decoding module 1004 may further perform S9003.

Embodiment 5

For RL pictures (that each can reference a library picture and support random access) that immediately follow two consecutive sequence headers respectively in a bitstream, there is a maximum of one library picture that is in a library picture referenced by the latter RL picture in the bitstream and that is different from a library picture referenced by the former RL picture in the bitstream. In addition, when the latter RL picture in the bitstream references a library picture that is different from the library picture referenced by the former RL picture in the bitstream, at least a picture displayed in k seconds should be included between the two consecutive sequence headers. Impact of a k-second limitation is that there is a capability of decoding one more picture every k seconds.

An encoder performs the following operations:

1. Initialize an encoding moment T of a previous main bitstream picture that references a library picture, where an initialization value of the encoding moment T is not greater than −k, and initialize a library picture set L that may be referenced during encoding of a main bitstream picture to infinite.

2. When an $i^{th}$ main bitstream picture is encoded:

(a) If the current picture is an RL picture, and the RL picture is not the first RL picture, check whether a difference between an encoding moment $t_i$ of the current encoded picture and T is greater than k, and (1) when $t_i-T>=k$, select m (m>=0) library pictures from the library picture set L, and select n (n>=0) library pictures that are not in the set L, where the m+n library pictures form a reference picture set, and when m+n>0, use the m+n selected library pictures as a new library picture set L that may be referenced, and update a value of T to $t_i$, or (2) when $t_i-T<k$, select m (m>=0) library pictures from the library picture set L, where the m library pictures form a reference picture set.

(b) If the current picture is not an RL picture, select m (m>=0) library pictures from the library picture set L, where the m library pictures form a reference picture set.

3. Encode the $i^{th}$ encoded picture by using the reference picture set.

4. If the $i^{th}$ main bitstream picture is not the last picture in a sequence, return to step 2, and i=i+1, or if the $i^{th}$ main bitstream picture is the last picture in a sequence, an encoding process ends.

Figure 10A:
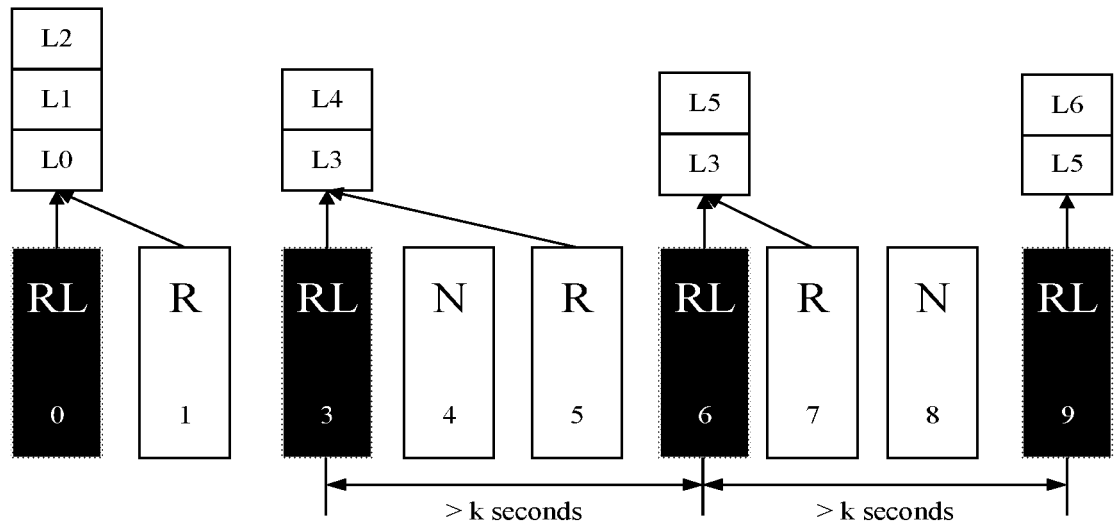
FIG. 10A shows an example of a possible structure of a bitstream in the embodiments of the present disclosure.

A structure of a bitstream generated by the encoder is shown in FIG. 10A, and the foregoing decoding limitation does not exist between RL3 and RL0. In the example bitstream, L* represents a library picture, R* represents an encoded picture that references a library picture, RL* represents an encoded picture that references only a library picture, and N* represents an encoded picture that does not reference a library picture.

A decoder performs the following operations.

Receive the bitstream obtained through encoding by using a library-based video coding method, where if the bitstream satisfies the following condition, the decoder needs to decode fk+n pictures in k seconds.

(a) For an RL picture A that immediately follows a sequence header in a bitstream, that supports random access, and that references only a library picture, an RL picture closest to A in at least one RL picture that is in the bitstream, that immediately follows a sequence header, and that is located before A is denoted as B, where the sequence headers immediately followed by the RL picture A and the RL picture B are two consecutive sequence headers. There is a maximum of n library pictures that are in library pictures referenced by A but that are not referenced by B, and a quantity of pictures decoded between A and B is at least a quantity of pictures in k seconds corresponding to the frame rate f that is of the video sequence and that is claimed in the bitstream. Impact of a k-second limitation is that there is a capability of decoding one more picture every k seconds.

For the $i^{th}$ main bitstream picture:

(a) If the picture references a library picture, decode a library picture that is newly added relative to a library picture referenced by a previous main bitstream picture, where there is a maximum of n newly-added library pictures, and use the foregoing library picture as a reference picture to decode the main bitstream picture.

(b) If the picture does not reference a library picture, decode the main bitstream picture.

If the $i^{th}$ main bitstream picture is not the last picture in the sequence, return to a previous step, and i=i+1, or if the $i^{th}$ main bitstream picture is the last picture in the sequence, a decoding process ends.

Figure 10B:
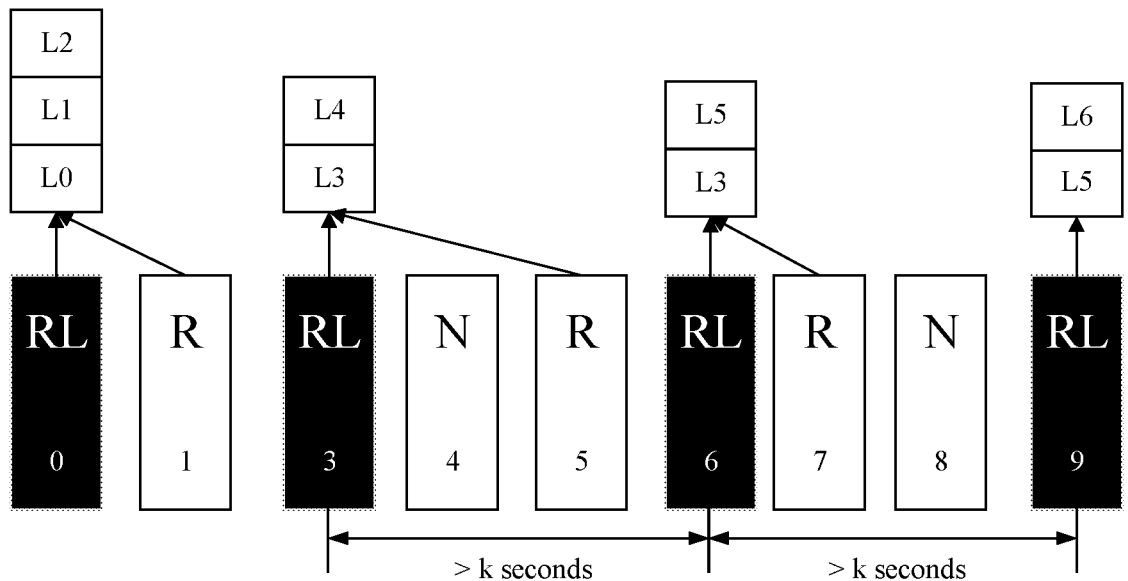
FIG. 10B shows an example of a possible structure of a bitstream in the embodiments of the present disclosure.
Figure 10C:
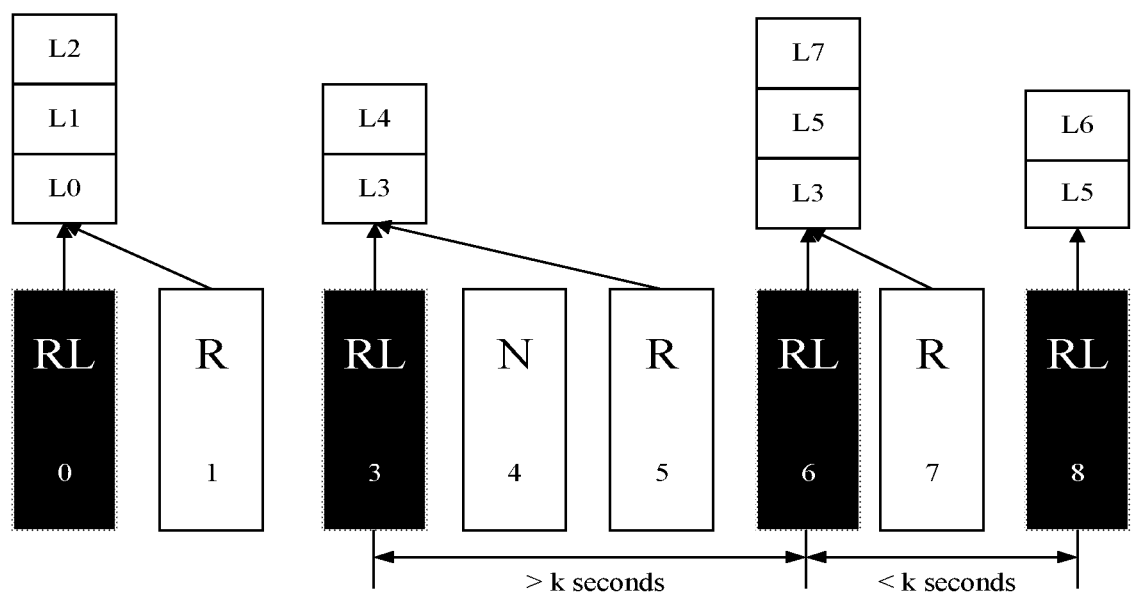
FIG. 10C shows an example of a possible structure of a bitstream in the embodiments of the present disclosure.
Figure 11:
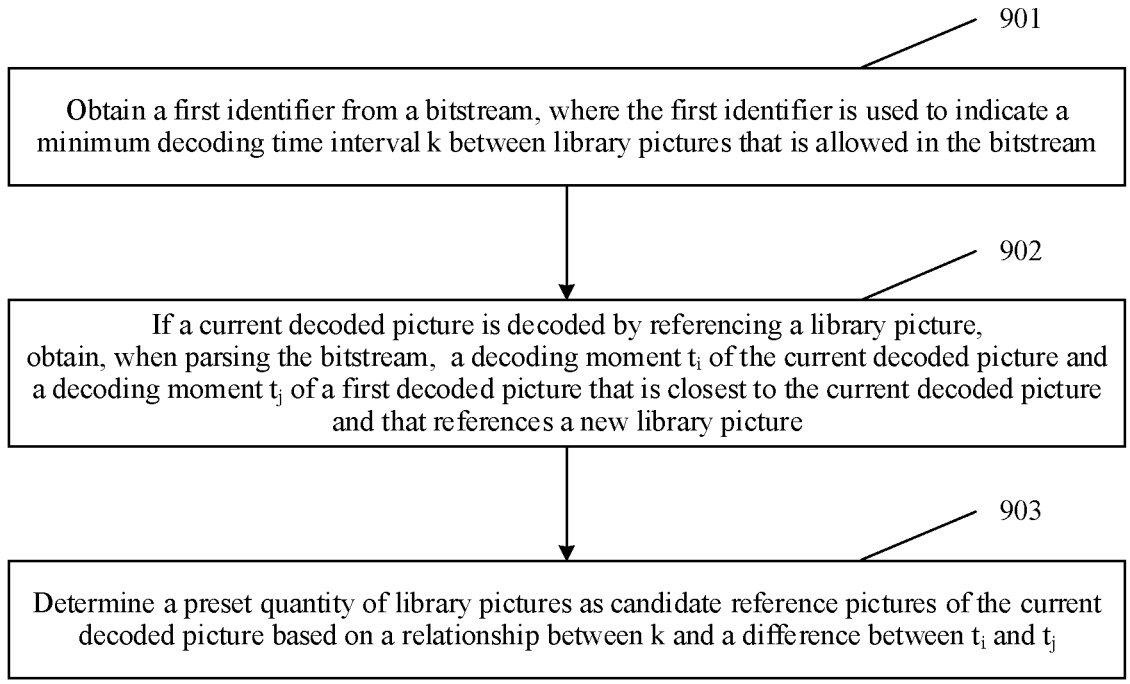
FIG. 11 is a schematic flowchart of a decoding method for implementing the embodiments of the present disclosure.

For example, when the decoder (limited to decoding a maximum of one library picture in k seconds) receives a bitstream shown in FIG. 10B, the decoder can implement real-time decoding because a decoding time of a library picture corresponding to RL0 may be obtained by increasing a start delay due to the start delay is allowed although RL0 references a plurality of library pictures. Therefore, although RL3 references two more library pictures than RL0, a decoding time of a library picture corresponding to RL3 is not constrained by a time interval between RL0 and RL3.

For example, when the decoder (limited to decoding a maximum of one library picture in k seconds) receives a bitstream shown in 10C, the decoder cannot implement real-time decoding of RL6 and RL8 because there are two different library pictures in library pictures referenced by RL6 and RL3 although a time interval between RL6 and RL3 is greater than k seconds, and because a time interval between RL8 and RL6 is less than k seconds although there is only one different library picture in library pictures referenced by RL8 and RL6.

An embodiment of the present disclosure further provides a device 1000. The device 1000 includes a first obtaining module 1001, a second obtaining module 1002, and a determining module 1003.

The first obtaining module 1001 is configured to obtain a first identifier from a bitstream, wherein the first identifier is used to indicate a minimum decoding time interval k between library pictures that is allowed in the bitstream.

The second obtaining module 1002 is configured to, if a current decoded picture is decoded by referencing a library picture, obtain, when parsing the bitstream, a decoding moment $t_i$ of the current decoded picture and a decoding moment $t_j$ of a first decoded picture that is closest to the current decoded picture and that references a new library picture, where the new library picture is a library picture that is not decoded or needs to be re-decoded when the first decoded picture is decoded.

The determining module 1003 is configured to determine a preset quantity of library pictures as candidate reference pictures of the current decoded picture based on a relationship between k and a difference between $t_i$ and $t_j$.

It should be noted that the first obtaining module 1001, the second obtaining module 1002, and the determining module 1003 may be used in an inter prediction process on an encoder side or a decoder side. Further, on the encoder side, these modules may be used in the inter prediction unit 244 in the prediction processing unit 260 of the encoder 20, and on the decoder side, these modules may be used the inter prediction unit 344 in the prediction processing unit 360 of the decoder 30.

It should be further noted that for specific implementation processes of the first obtaining module 1001, the second obtaining module 1002, and the determining module 1003, reference may be made to detailed descriptions in the foregoing method embodiments. For brevity in this specification, details are not described herein again.

A person skilled in the art can understand that the functions described with reference to various illustrative logical blocks, modules, and algorithm steps disclosed and described in this specification can be implemented by hardware, software, firmware, or any combination thereof. If being implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another (for example, according to a communication protocol). In this manner, the computer-readable medium may generally correspond to (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

In an example but not a limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that is accessible by a computer. In addition, any connection is properly referred to as a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a DIGITAL VERSATILE DISC (DVD), and a BLU-RAY DISC. The disks usually reproduce data magnetically, whereas the discs reproduce data optically with lasers. Combinations of the foregoing items should also be included in the scope of the computer-readable media.

An instruction may be executed by one or more processors such as one or more digital signal processors (DSPs), general-purpose microprocessors, ASICs, FPGAs, or other equivalent integrated circuits or discrete logic circuits. Therefore, the term "processor" used in this specification may refer to the foregoing structure, or any other structure that is applicable to implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be all implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize function aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

In the foregoing embodiments, descriptions of the embodiments have respective focuses. For a part that is not described in detail in an embodiment, refer to related descriptions in other embodiments.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A video decoding method, the method comprising:
obtaining a first decoded picture, wherein the first decoded picture is a picture in a main bitstream, wherein the first decoded picture immediately follows a sequence header of the main bitstream, wherein the first decoded picture is located before a current to-be-decoded picture in the bitstream, wherein the first decoded picture supports a random access function, and wherein the first decoded picture references a first library picture;
using a new library picture as a reference picture of the current to-be-decoded picture, wherein the current to-be-decoded picture is a picture that supports random access and that references a second library picture, wherein a picture that supports the random access function is intra coded or inter coded through inter prediction, wherein the new library picture is a picture not in a picture set that includes a random access segment to which the current to-be-decoded picture belongs, and wherein the new library picture is in a random access segment closest to and before the random access segment to which the current to-be-decoded picture belongs; and
determining a first quantity of decoded pictures between the current to-be-decoded picture and the first decoded picture in the main bitstream based on a product of f and k, wherein k is a minimum decoding time interval between library pictures that is allowed in the main bitstream, wherein f is a frame rate that is of a video sequence and that is claimed in the main bitstream, wherein a second quantity of new library pictures is less than or equal to a preset value n, wherein n is a positive integer, wherein the new library picture is a library picture that is referenced by the current to-be-decoded picture and is not referenced by the first decoded picture, and wherein the first quantity of decoded pictures is greater than the second quantity of new library pictures.

2. The method of claim 1, further comprising decoding the current to-be-decoded picture based on the new library picture.

3. The method of claim 1, wherein n is equal to 1.

4. The method of claim 1, further comprising obtaining the new library picture by decoding a library bitstream.

5. The method of claim 1, wherein n is equal to 2.

6. The method of claim 1, wherein the main bitstream comprises a third library picture referenced by each picture in the video sequence.

7. The method of claim 1, wherein the first quantity of decoded pictures is a sum of n and the product of f and k.

8. An apparatus, comprising:
a memory configured to store instructions; and
a processor coupled to the memory, wherein the instructions cause the processor to be configured to:
obtain a first decoded picture, wherein the first decoded picture is a picture in a main bitstream, wherein the first decoded picture immediately follows a sequence header of the main bitstream, wherein the first decoded picture is located before a current to-be-decoded picture in the bitstream, wherein the first decoded picture supports a random access function, and wherein the first decoded picture references a first library picture;
use a new library picture as a reference picture of the current to-be-decoded picture, wherein the current to-be-decoded picture is a picture that supports random access and that references a second library picture, wherein a picture that supports the random access function is intra coded or inter coded through inter prediction, wherein the new library picture is a picture not in a picture set that includes a random access segment to which the current to-be-decoded picture belongs, and wherein the new library picture is in a random access segment closest to and before the random access segment to which the current to-be-decoded picture belongs; and
determine a first quantity of decoded pictures between the current to-be-decoded picture and the first decoded picture in the main bitstream based on a product of f and k, wherein k is a minimum decoding time interval between library pictures that is allowed in the main bitstream, wherein f is a frame rate of a video sequence in the main bitstream, wherein a second quantity of new library pictures is less than or equal to a preset value n, wherein n is a positive integer, wherein the new library picture is a library picture that is referenced by the current to-be-decoded picture and is not referenced by the first decoded picture, and wherein the first quantity of decoded pictures is greater than the second quantity of new library pictures.

9. The apparatus of claim 8, wherein the first quantity of decoded pictures is a sum of n and the product of f and k.

10. The apparatus of claim 8, wherein the instructions further cause the processor to be configured to decode the current to-be-decoded picture based on the new library picture.

11. The apparatus of claim 8, wherein n is equal to 1.

12. The apparatus of claim 8, wherein the instructions further cause the processor to be configured to obtain the new library picture by decoding a library bitstream.

13. The apparatus of claim 8, wherein n is equal to 2.

14. The apparatus of claim 8, wherein the main bitstream comprises a third library picture referenced by each picture in the video sequence.

15. A computer program product comprising computer-executable instructions stored on a non-transitory computer-readable medium that, when executed by a processor, cause an apparatus to:
obtain a first decoded picture, wherein the first decoded picture is a picture in a main bitstream, wherein the first decoded picture immediately follows a sequence header of the main bitstream, wherein the first decoded picture is located before a current to-be-decoded picture in the bitstream, wherein the first decoded picture supports a random access function, and wherein the first decoded picture references a first library picture;
use a new library picture as a reference picture of the current to-be-decoded picture, wherein the current to-be-decoded picture is a picture that supports random access and that references a second library picture, wherein a picture that supports the random access function is intra coded or inter coded through inter prediction, wherein the new library picture is a picture not in a picture set that includes a random access segment to which the current to-be- decoded picture belongs, and wherein the new library picture is in a random access segment closest to and before the random access segment to which the current to-be-decoded picture belongs; and
determine a first quantity of decoded pictures between the current to-be-decoded picture and the first decoded picture in the main bitstream based on a product of f and k, wherein k is a minimum decoding time interval between library pictures that is allowed in the main bitstream, wherein f is a frame rate that is of a video sequence and that is claimed in the main bitstream, wherein a second quantity of new library pictures is less than or equal to a preset value n, wherein n is a positive integer, wherein the new library picture is a library picture that is referenced by the current to-be-decoded picture and is not referenced by the first decoded picture, and wherein the first quantity of decoded pictures is greater than the second quantity of new library pictures.

16. The computer program product of claim 15, wherein the computer-executable instructions further cause the apparatus to decode the current to-be decoded picture based on the new library picture.

17. The computer program product of claim 15, wherein n is equal to 1.

18. The computer program product of claim 15, wherein n is equal to 2.

19. The computer program product of claim 15, wherein the computer-executable instructions further cause the apparatus to obtain the new library picture by decoding a library bitstream.

20. The computer program product of claim 15, wherein the main bitstream comprises a third library picture referenced by each picture in the video sequence.

* * * * *

UNITED STATES PATENT AND TRADEMARK OFFICE
CERTIFICATE OF CORRECTION

PATENT NO. : 11,496,754 B2
APPLICATION NO. : 17/366735
DATED : November 8, 2022
INVENTOR(S) : Yu et al.

Page 1 of 1

It is certified that error appears in the above-identified patent and that said Letters Patent is hereby corrected as shown below:

In the Claims

Claim 1: Column 46, Line 12: "picture in the main bitstream based on a product off and" should read -- picture in the main bitstream based on a product of f and --.

Claim 8: Column 46, Line 66: "product off and k, wherein k is a minimum decoding" should read -- product of f and k, wherein k is a minimum decoding --.

Claim 15: Column 48, Line 12: "picture in the main bitstream based on a product off and" should read -- picture in the main bitstream based on a product of f and --.

Signed and Sealed this
Eleventh Day of April, 2023

*Katherine Kelly Vidal*

Katherine Kelly Vidal
*Director of the United States Patent and Trademark Office*